United States Patent [19]
Di Bella

[11] Patent Number: 5,904,324
[45] Date of Patent: May 18, 1999

[54] NON-MOTORIZED AIRCRAFT FLIGHT CONTROL SYSTEM

[76] Inventor: Geoffrey Di Bella, 43609 N. Elm Ave., Lancaster, Calif. 93534

[21] Appl. No.: 08/410,358

[22] Filed: Mar. 24, 1995

[51] Int. Cl.⁶ .................................................. B64D 17/34
[52] U.S. Cl. ........................ 244/152; 244/151 R; 244/142
[58] Field of Search .................................... 244/152, 145, 244/151 R, 142, 902

[56] References Cited

U.S. PATENT DOCUMENTS

| | | | |
|---|---|---|---|
| 2,411,381 | 11/1946 | Manson | 244/151 R |
| 3,412,963 | 11/1968 | Struble | 244/152 |
| 3,690,604 | 9/1972 | Guilfoyle | 244/148 |
| 3,756,547 | 9/1973 | Snyder et al. | 244/152 |
| 3,809,342 | 5/1974 | Lemoigne | 244/145 |
| 3,866,862 | 2/1975 | Snyder | 244/152 |
| 4,729,530 | 3/1988 | Jalbert | 244/145 |
| 5,029,777 | 7/1991 | LeBlance et al. | 244/152 |

FOREIGN PATENT DOCUMENTS

| | | | |
|---|---|---|---|
| 0299999 | 12/1990 | Japan | 244/152 |

OTHER PUBLICATIONS

"The Parachute Manual" by Dan Poynter, 1994: p. 4. 116 Published by Para Publishing.

Primary Examiner—Charles T. Jordan
Assistant Examiner—Tien Dinh
Attorney, Agent, or Firm—Dennis W. Beech

[57] ABSTRACT

The non-motorized aircraft flight control system provides additional lines, cords, hooks and other devices to existing paraglider aircraft to aid in the control of the paraglider wing elements such as the wing suspension lines which are used to change the shape of the wing to change the flight characteristics of the aircraft. The simplest version of the improvements facilitate the location and pulling of the appropriate control lines. Visual facilitators are used to aid in identifying the proper elements. The more complex changes involve cables and handle grips with gear systems similar to a bicycle shifting mechanism. In all cases where a control position is to be maintained for a period of time there is a device to retain the cord or cable in the proper position. A further variation involves the use of a transmission box to shift and control the cables and to use the pilot's leg to aid in manipulation of various elements of the paraglider. All of the elements do not have to be included on any given paraglider, but those controls desired by the pilot may be chosen such as the basic elements to retain the brake handles in the optimum position.

49 Claims, 18 Drawing Sheets

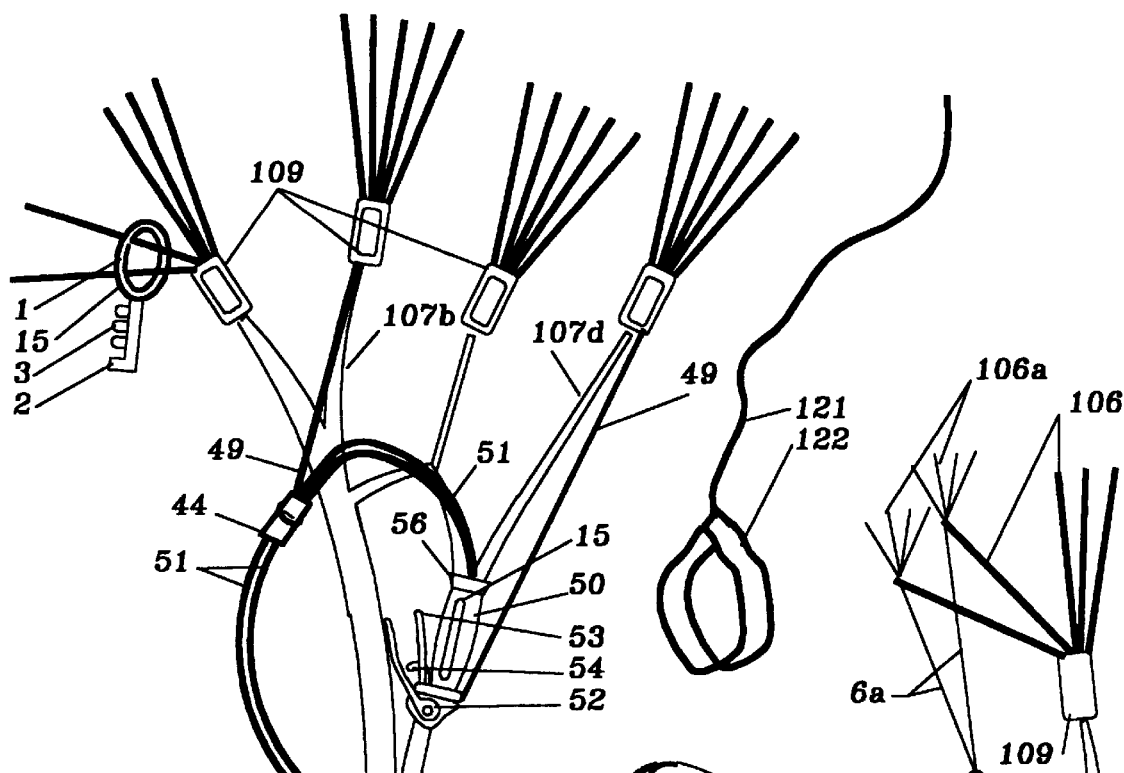
FIG.5
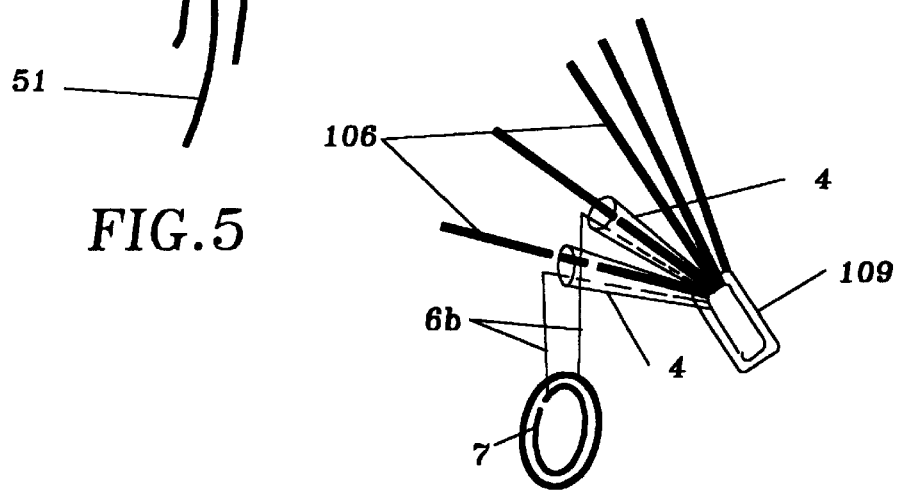
FIG.5b
FIG.5A

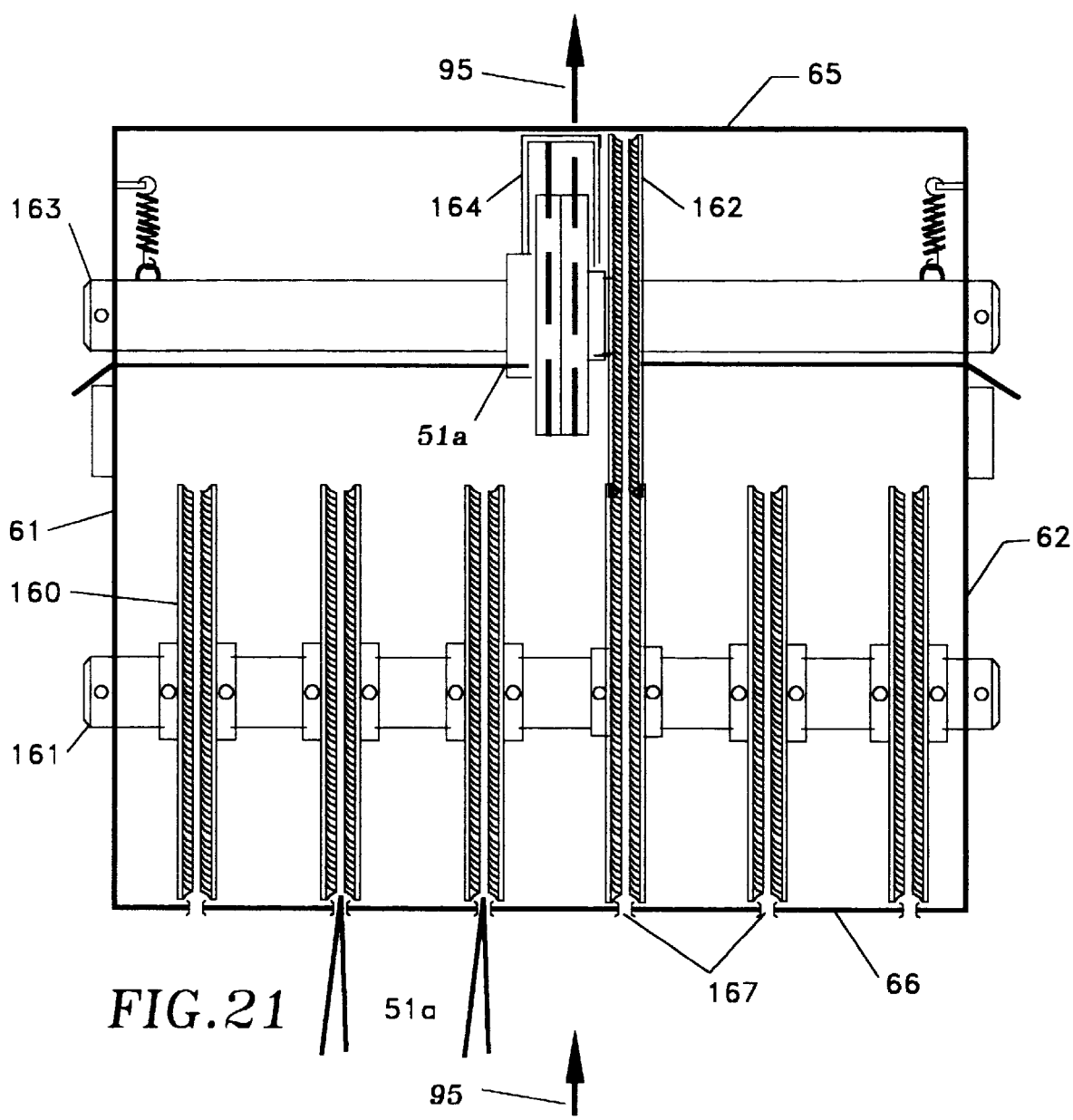
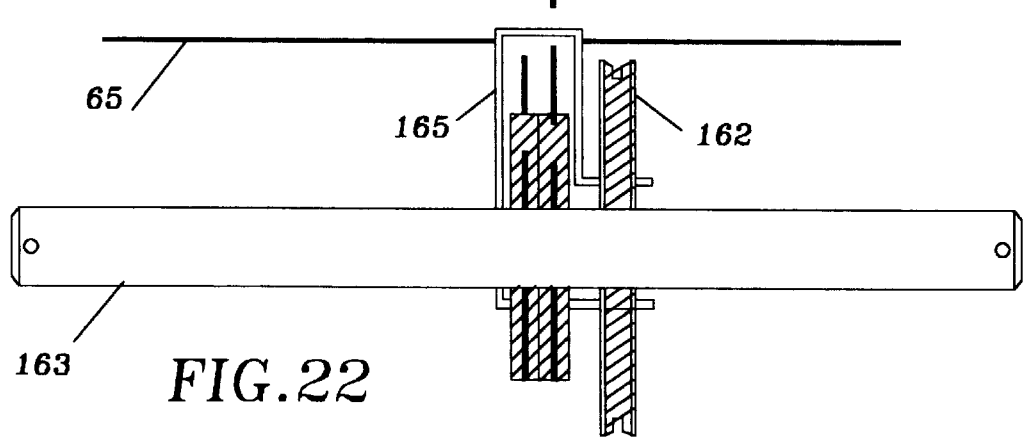
FIG.21
FIG.22

NON-MOTORIZED AIRCRAFT FLIGHT CONTROL SYSTEM

BACKGROUND OF THE INVENTION

1. Field of the Invention

This invention relates generally to a type of lightweight, pilot-carrying aircraft, ultralights, which do not use motors or propellers. The new control system provides additional means to control those ultralights that receive their lift from an inflatable ram-air flexible airfoil wing, particularly the paraglider.

2. Description of Related Art

Foot launched, non-motorized flying apparatuses include hang gliders, paragliders and hybrids of the hang glider and paraglider. Hybrids and hang gliders represent a distinctly different field than paragliders because their rigid frames and other rigid members put them very much closer to the more common aircraft which use rigid frame members.

2.A. FOUR PARAGLIDER AREAS

The three basic areas of current art paragliders are illustrated in schematic form in FIGS. 1, 2 and 3, i.e.: the harness area; the wing suspensory elements, risers, etc., and brake system for wing control; and the wing (100) itself.

A fourth area is sometimes chosen by more advanced pilots depending upon the paraglider model. Specifically, some pilots have chosen a model which can have a device that involves the legs. This device is commonly known as the speed stirrup system (130,131,132,135,136). Another area, not physically related to the legs, but functionally related to the speed stirrup system, is the trim tab system (141,144,145,149) located on the D riser (107*d*).

Referring to FIGS. 1 through 3, the first area, the harness (112) area, holds the pilot seated on a seat board (115). This area includes the elements up to the main carabiner quick link (110) on each side.

The pilot/harness is suspended from the second area by the elements of the wing suspensory parts (108, 106, 106*a*, 107*a–d*, 109, 110). As shown in FIG. 4, the main carabiner quicklink (110) is looped by a main carabiner riser complex (108*a*). This main carabiner riser complex is the joining together of the 4 risers, which are synthetic straps about $^{15}/_{16}$ inches wide and $^{3}/_{32}$ inches thick, that suspend the entire weight of pilot and harness. As seen in FIGS. 1, 3, and 4, the main carabiner riser complex (108*a*) continues on usually as a lower riser complex (108*b*) of four riser straps (107*a–d*): A riser, B riser, C riser and D riser. In the lower riser complex (108*b*) area these 4 straps are intricately interrelated. FIG. 4 shows one variation, but at a distance, such as in FIG. 3, this area of lower riser complex (108*b*) resembles a loop. In the upper riser complex (108*c*), these straps are more clearly independent. The upper ends of the risers (107*a–d*) are attached onto carabiner quick links (109). The carabiner quick links (109) are in turn attached to 5 separate lines (106). These lines (106) are attached in turn to supplemental suspension lines (106*a*), which in turn attach to approximately 150 places on the wing lower surface (104) of an inflatable, completely flexible cloth-like wing (100).

The speed stirrup system (150) including the Pulley (135), cord (131), etc. and trim tab system (149 including 141,145, 144, etc.) are not on all paragliders. Both systems attach on the lower riser complex (108*b*); however the speed system (150) attaches to the front most riser. The trim tab system (149) attaches to the rear most riser, which is the D riser (107*d*) in this model. These two add on systems are discussed below.

Spatially related to second area of the paraglider is the wing control brake system (120, 121, 122). Along the wing trailing edge (102) of the wing (100) there are about 20 attachments which join into a brake line (121) leading to each of the pilot's hands. This brake line (121) serves no pilot suspension function and the brake line (121) is attached to the soft brake loop (120) which the pilot holds. The brake loops (120) are the control means the pilot has for the crucial task of helping the wing (100) to remain filled with air. Actually, proper brake loop (120) positioning and movement are critical for landing, turning and safety, and indeed for all flight activities.

The third area is the wing (100). Air comes in at the wing's (100) leading edge (101) through open window areas (105) and the air passing in separates the upper surface (103) from the lower surface (104). The wing (100) is constructed in such a way to then create an airfoil that flies. If the wing deflates, the pilot falls to his death.

Over the past 10 years the changing design of the wings (100) of paragliders now permits unlimited hours of soaring thousands of feet above the ground.

Experts and inventors in the field of paragliders and hang gliders have long conceptualized the hang glider and paraglider aircraft as distinct from aircraft involving propellers or motors. Critical to the satisfaction of the pilot is the sense of maximally pure and natural flying with the winds.

This is particularly characteristic of the paraglider aircraft which has the traditional parachute as it's ancestor. However, the parachute differs in a number of ways. For example, only rarely does the parachute permit ascending; indeed, it is designed specifically to descend.

The suspensory area of the paraglider has become more specialized as the paraglider has evolved from the parachute. It's component parts are more akin structurally to the sport of parachuting or sky diving than to hang gliding or motorized aircraft. A complete paraglider aircraft can still be wrapped up into a flexible trash can sized bag weighing about 29 pounds. The concept of such a soft flexible aircraft is diametrically opposite to the concepts of rigid flying machines, such as the hang glider. It would seem that experts in the field are not able to conceptualize the possibility of any staging/framework/leverage platform for a paraglider. The paraglider expert only conceptualizes the rigid structure of the seat board (115) as a place for the pilot to sit.

The typical paraglider pilot might view the beauty and uniqueness of the paraglider as destroyed and transformed into something completely different by such machines as U.S. Pat. No. 4,934,630 (1990) whereby a motorized propeller is attached to the back of the paraglider harness.

The control bar (46) in invention, U.S. Pat. No. 5,160,100 (1992), is not relevant to non-motorized paragliders because the results of its use depend specifically on the powerful motor and propeller system. Please see the discussion of this point in the patent in column 2, lines 5–22. This removes the disclosure from the realm of the paraglider and hang glider art. The control bar adds no more specific function for the hands than the presently known hang glider and paraglider. The control bar in U.S. Pat. No. 5,160,100 has at least one feature that renders it incompatible with the configuration found on the typical paraglider and hang glider; namely, the pilot is suspended from the control bar.

2.B. PRESENT PARAGLIDER CONTROLS

Both the hang glider and paraglider include some basic means to affect direction of movement, angle of attack and configuration of the wing. The basic hang glider and paraglider use quite crude methods. For example, the hang glider involves a primitive whole body weight shifting by hands holding on a control bar.

The paraglider pilot often uses lateral weight shifts through his buttocks on the seat board. More pilot weight on one side and less on the opposite causes the paraglider gradually to roll and then yaw a bit effecting a slight slow turn.

However, in accordance with invention U.S. Pat. No. 5,029,777 (1991), the pilot may also effect pitch changes with a weight shift in his seat from front to back. In turbulent winds, especially found in thermal conditions for soaring, pilots find such multi-directional seat motility dangerous and unsettling.

As in FIG. 1, the paraglider pilot is instructed to use each hand to hold a cloth brake loop (120) attached to brake lines (121) which are attached to the wing trailing edge (102) of the canopy wing (100). Holding down both brake loops (120), with the hands, at a level about 4 inches below the top of the pilot's shoulder is recommended to prevent wing deflation/collapses. This position is shown in FIGS. 2 and 3 as a dotted line (148).

Pulling just one brake loop (120) will turn the aircraft in the direction of the hand that is pulling. Letting up on the brake loops (120) allows the trailing edge (102) of the wing (100) to rise and the whole outline of the airfoil wing (100) is flattened; thus, the paraglider will fly faster.

Related art allows only one way to position the vital brake loop (120), other than being actively held by the hand. This one position occurs when the pilot releases the brake loop (120) and the brake loop (120) is pulled up by the flying wing (100) to a brake loop movement limiter (122) located on the D riser strap (107d) above the head as shown in FIGS. 1 and 2. In related art, the brake loop limiter (122) is a ring or other guide through which the brake line (121) passes. Without this brake loop limiter (122), the brake loop (120) would be blown out of reach of the pilot during reverse launch or while in the air. The brake loop limiter (122) has no other function; thus, it plays no part in keeping the wing (100) inflated or modifying the shape of the paraglider wing (100). On the ground, most paragliders have a holding means, often a button snap in means, to anchor temporarily the brake loop (120) on the D riser (107d), near brake loop limiter (122).

German Patent No. 4,101,241 (1992) describes a slightly different way of attaching the brake line (121) to the wing (100), but otherwise shows the identical approach of a hand held loop with its line passing through a similar posterior riser strap limiter, like the above mentioned brake loop limiter (122).

Besides the changes induced by altering the position of the constantly used brake loops (120), the pilot can effect additional changes in the wing (100) by pulling with his bare hands at one or more straps (107a–d) or wing suspension lines (106); namely, B riser stall, D riser stall, and wing tip collapse. An additional add on element is a trim tab system (149) in the D riser (107d) area.

Nothing involves the legs, except an add on speed stirrup system (130 through 136), to modify the paraglider in flight.

Thus, for flight purposes there are four control methods for the hands, one for the legs, and one for the buttocks.

2.C. THE SPEED STIRRUP SYSTEM

A pilot may choose to add on a speed stirrup system (150) to the basic paraglider. This system is not known to be patented, but is in public use as illustrated in FIGS. 1 and 2, at (130–132) and FIG. 3 at (131, 135, 136).

FIG. 2 and 3 shows the speed stirrup (130) as a rigid tube structure. An example, is a plastic tube of 10 inches by ¾ inches overall diameter with walls about 3/32 inches thick. It usually dangles by speed stirrup cords (131) which are below either side of the seat board (115) area. The pilot's feet can push at the speed stirrup (130), which is part of the total speed stirrup system (150). This system enables the pilot's feet to effect about 4 inches of shortening on the A riser (107a). It does so by the particular attachments which allow the leg to pull on cord (131) which goes through a speed stirrup pulley (135) attached to the A riser (107a) about 4 inches above the final attachment point (136) of cord (131) on the A riser (107a). Thus, pushing on speed stirrup (130) causes the speed stirrup attachment (136) to be pulled to the speed stirrup pulley (135) attachment, thus shortening the A riser (107a) by about 4 inches. This also produces a much lesser shortening of riser B (107b) and riser C (107c). Therefore, pushing at the speed stirrup (130) will flatten the wing (100) by more complex changes to the wing than is done by the flattened wing shape resulting from having no downward force on the brake loops (120) from the pilot's hands. The practical effect of pressure on the speed stirrup (130) is to cause the paraglider to fly faster.

Among limitations and disadvantages of this system is that the pilot has to keep exerting pressure on the speed stirrup (130) to keep the faster speed. This is tiring and prevents more use of the weight shifting in one's seat board (115) to achieve flatter turns with less loss of altitude. In addition, one can not fix the speed system in the fastest configuration so that one can launch in faster winds. Also, it is much more difficult to get the paraglider certified as stable when changes to more than one pair of risers is held in place by some sort of fixing system that requires no muscle power. Finally, the maximum the legs can move is about 10 inches. This larger movement is possible where there is a 2 pulley arrangement in speed stirrup pulley (135) area.

Current art discloses no assembly whereby the pilot's legs may be used for any other function during flight than pushing at the speed stirrup (130) to cause the paraglider to fly faster. Of course, however, at ground level, the legs are used to launch the aircraft by running and the legs are used to land.

Another problem with the current speed stirrup system is that it is often difficult for the pilot to hook the speed stirrup (130) with a foot, especially in turbulent winds, or when the pilot is anxious because of a risky situation that has developed. Some pilots have used a solution to the unhookable stirrup problem that adopts a stretchable stirrup to speed stirrup foot cord (132) as illustrated in FIG. 2. Before launch, the pilot loops one end of the speed stirrup foot cord (132) around his shoe. The other end of the speed stirrup foot cord (132) is attached to the rigid speed stirrup (130). When the pilot straightens his leg, speed stirrup foot cord (132) brings the speed stirrup (130) into a position whereby the pilot can try to snag speed stirrup (130) with the other shoe.

However, this solution has its own problem because it increases the flailing of the dangling stirrup against the legs during the run and related twisting maneuvers on take off. This is annoying and disconcerting, especially in difficult take off and landing conditions, because the pilot may be tripped by the flailing stirrup. The cord also makes for slight jerking of the entire pulley/cord system, through the loop/stirrup set up, which destabilizes the wing. In addition, the pilot often does not have the luxury of landing on golf-course-smooth turf. All of the dangling cords may very easily become entangled in bushes and weeds.

Another method in current use adopts a tough but flexible speed stirrup cord tube (133), typically coming down another 12 inches below the speed stirrup (130), FIG. 2A. Speed stirrup cord tube (133) makes it easier for the pilot to find with the foot. The speed stirrup cord (131) in this case does not pass horizontally through speed stirrup (130), but through additional vertical holes in speed stirrup (130) then through speed stirrup cord tube (133).

2.D TRIM TAB SYSTEM

A few paraglider models can be certified with trim tabs, FIG. 3. These use 2 synthetic straps (141, 145), about 15/16 inches wide and 1/16 inches thick on each of the left and right D risers (107d). These straps are part of the entire trim tab system (149). A trim tab strap (141), one on the right and one on the left, is attached on each D riser (107d) as shown at trim tab straps (141) in FIG. 3, 4, 17. Typically, each trim tab strap (141) is looped around one end of trim tab law buckle (144), FIG. 17. Each trim tab buckle strap (145) has one end attached to the D riser (107d) and it's other end passes through the trim tab jaw clamp (142), which has a spring clamp built inside.

Changing the trim tab straps (141) can only be done by searching them out, trying to grab trim tab straps (141), then moving the trim tab straps (141) by pulling down with the hands on the ends that pass through the trim tab jaw clamp (142). The maximum that can be pulled down is 4 inches and this shortens the D riser along with some shortening of risers C and B. After the trim tab strap (141) length has been changed, it is immediately held in place automatically by the spring clamp part of the trim tab jaw clamp (142). The pilot can then return full attention to the brake loops (120).

To return the D riser (107d) to its full length, the pilot searches for the trim tab jaw clamp (142), tries to pinch the spring clamp, then continually pinches over a period of time of more than one second the spring clamp with the fingers to keep open the spring clamp to allow the upward pressure of the wing (100) to pull the trim tab strap (141) completely back up through the trim tab jaw clamp (142). This in turn allows the back part of the wing (100) to lift; therefore, a flatter shape and ability to fly faster. This use of the hands to operate the trim tab system prevents the use of the hands in attending only to keeping the brake loops (120) in the optimum position for safety.

Another disadvantage of the present trim tab jaw clamp (142) is that one side actually hangs pressed against another riser, so it is not easily and quickly possible to insert the fingers into position to be able to fully squeeze the spring clamp. Also, different than a plain cam buckle, the fingers must be kept on the spring clamp to prevent the built in spring from closing the spring clamp, thus preventing any more movement of the trim tab strap upward. This situation means that longer time away from attending to the brake loops (120) is required thus increasing risk.

Oversimplifying, the trim tab system's lower trim tab buckle straps (145) in effect permit about the same effect as the use of the speed stirrup (130); namely, inducing a faster or slower flying wing configuration. The trim tab system, however, omits any use of the legs, among other differences. In addition, the trim tab jaw clamp (142) allows the trim tab strap (141) to be fixed at the changed length while the hands return to managing the brakes. FIG. 4 indicates about where the speed stirrup system (150) and trim tab system (149) pull on primarily the A risers (107a) or D risers (107d) respectively. Seldom does a pilot get both speed stirrup and trim tab systems on his glider. It is not known if a paraglider has ever been safety rated using both.

Given the dependence of these ultralights on fickle winds, it is important to put safety above such performance issues as maximum lift, glide ratio and speed.

The pilot is much safer when he can attend as much as possible to maintaining optimum pressure on and positioning of the brake loop (120). The pilot should be ready to change brake loop (120) position at a moment's notice. The pilot is also much safer if he maintains his eyes in the direction of his desired flight path and/or looking out for other air traffic which is frequently heavy.

No mechanism currently exists for accomplishing at least three maneuvers without risking poor positioning of the brake loops (120) that significantly introduces risk, especially in strong or turbulent wind conditions. Such wind conditions can occur unpredictably.

Not infrequently the entire paraglider and the pilot are being bounced by wind gusts. The performance of three maneuvers in dangerous conditions is always more difficult than practicing the above steps in smooth conditions.

The three maneuvers risk undesired wing collapse because performing these takes the locations of the brake loops (120) away from the optimum stabilization point (148), about 4 inches below the top of the shoulder. The three maneuvers include: Wing Tip Collapse, B Riser Stall, and Trim Tab Adjustment already discussed. These three maneuvers cause double jeopardy because they also require removal of the eyes from focusing on the above mentioned safety concerns. Current yearly paragliding mishap reports reflect one of the most frequently mentioned problems is wing collapses or stalls. Collapses and stalls are more likely when the pilot fails to provide the correct amounts of brake pressure.

2.E WING TIP COLLAPSE AND B RISER STALL

To descend quickly and lose forward speed, the pilot grasps the carabiner quicklink (109) of the B riser (107b), pulls down 15–20 inches, and holds it down. This produces B riser stall and loss of most of the wing's lifting capacity.

Referring to FIGS. 3, 4, and 6, to fly as fast, yet descend more quickly, the pilot has to perform the following steps to modify the wing, i.e., a 20% wing tip collapse on each side known as Big Ears. First the pilot has to take his eyes off the best focal points in order to try and locate just 4 wing suspension lines (106) among 40 that are 10–15 inches above his head. He has to stretch up both hands as far as they can reach to grab just the 2 outer wing suspension lines on each A riser (107a) about 6 inches above the carabiner quicklink (109). Then he has to pull these lines laterally, then downward about 12 inches and hold them down. All this time the pilot has to ignore the proper positioning of the critical brake loops (120). Trying to pull straight down on said wing suspension lines (106) too close to the carabiner quicklink (109) is futile because this does not allow enough leverage to overcome the lift of the wing unless a pilot is remarkably strong. Even then, directly pulling down risks pulling down all 5 wing suspension lines (106) attached to the carabiner quicklink (109) of A riser (107a).

Having to reach up at least as high as the carabiner quicklink (109) of the A riser (107a) is awkward and only minimally allows holding the outer 2 wing suspension lines (106) of A risers (107a) in conjunction with holding onto the brake loops (120). Being able to do so quickly and easily would help with spot landing. Sometimes a wind gust blows the paraglider up from the path to a desired landing spot. If the pilot had a device that would help him hold and make small modifications in both of the 2 outer A riser (107a) wing suspension lines (106) and at the same time with the brake loops (120), he could better reduce the effect of unwanted lift and/or lower his altitude if he found himself coming in too high for the landing spot he needed.

To summarize, the current art paraglider parts of critical focus for control which the pilot must find, are: the brake loop (120), the first 5–10 inches of the 2 outer wing suspension lines (106) of the A riser (107a), the very top of the B riser (107b), the lower trim tab strap (141), the trim tab jaw clamp (142) and perhaps others.

2.F. VISUAL SUPPORT FOR CONTROLS

There is an absence of visual clues, color and patterns, to facilitate the finding of critical parts of the paraglider control system. Currently there is only a multitude of confusing colors often drawing attention to parts of the paraglider of no flight value. For example, bright yellow main horizontal harness straps (114) are often used.

2.G. OTHER CURRENT ART CONSIDERATIONS

Despite the need for the pilot to perform many flight functions at the same time, the workable and presently used hang gliders and paragliders do not allow the pilot to take advantage of the unique capacities of the fingers of the hand nor allow a direct working relationship between the fingers and the power of the legs to control the paraglider. In present paraglider systems the pilot has only a featureless tube speed stirrup (130) for the legs to act directly on the risers or featureless cloth brake loops (120) for the hands to directly act on the wing (100).

When having to deal with the brake loop (120)/brake line (121), any wing suspension lines (106) or one of the 4 pairs of risers (107), such as the two A risers (107a), current art paragliders have no contrivance to allow these parts to be lowered, held down, and released in one second. Of course, the pilot can actively hold these parts. Nor does current art allow at least retaining both brake loops about 4 inches below the top of the shoulder, positioned at the maximum stabilization position (148), whenever the hands are needed elsewhere.

There is another deficiency in current art. With current art at times the lifting air is so strong at take off that it is impossible for the pilot to make a safe launch. This is because he does not have time to pull the wing off the ground into the air and check the wing for proper inflation then position himself before the air lifts him dramatically off the ground. No current device allows the pilot to make a temporary large reduction in the lifting power of the wing until the pilot has time to assure safe integrity of the paraglider. Such a device must also allow quick and easy reestablishment of the lifting power for take off and rapidly penetrating forward.

Current art does not make use of any hook like device as part of a combination for holding down parts of the wing or for attaching parts together.

No current art has the elements of the present invention, i.e., a master control system for a number of control functions to be controlled while the hands are used to keep properly positioning the brake loops. Nor do present implementations have clutch, gear shift or transmission box equivalent apparatuses.

Another disadvantage is the current art paraglider pulley system. In a pulley system if a cord is not taught nothing will be effectuated until the cord is pulled straight and taught or until the pressure against an object against which the cord will straighten is greater than the weight of the object at the end of the cord. Also the cord will scrape across anything it touches. Current art does not use pull-pull cable systems to alleviate such problems.

2.H. SUMMARY OF MECHANICAL IMPLEMENTATIONS IN PARAGLIDERS

Thus, mechanical inventions in the field of what is usually conceptualized as an aircraft are not obvious to those involved in the art of hang gliding and paragliding to be applicable to paragliding and hang gliding. Simple machines include: the lever, pulley, wheel, axle, screw, and inclined plane/wedge in order to transmit or modify force or motion. The basic, without add ons, paraglider makes minimum use of simple machines for flight controls. For examples, the quicklinks make use of screw pairs sometimes with a spring added. Some of the harness buckles (116) have lever like elements.

A pilot can however add on the speed stirrup or trim tab system to a basic paraglider. The speed stirrup system makes use of the pulley machine. The most elaborate mechanical device as part of any paraglider is probably the trim tab jaw clamp (142) of the trim tab system. This clamp has a rod and a lever to open a spring in its housing, FIG. 17.

One definition of a machine is an apparatus with interrelated parts to perform work. Very broadly speaking, perhaps the wing is a machine of panels of cloth that converts the forces of the air to the work of moving the pilot.

Nor is there any use of more than two transmission elements in one device that exists in the paraglider assemblage. One definition of transmission elements includes elements for the transmitting of motive force. Such elements include: shafts, gears, belt trains, couplings, linkages, clutches, brakes, power screws, cams, flywheels, chain drives and bearings. Again, the brake line (121) runs from human arm power which is applied on the brake loop (120) to effectuate desirable changes, work, in the trailing edge (120) of the wing (100); therefor, maybe line (121) is a transmission element.

Current art does not contain transmissions with clutches. Typically, there is a shift device along with a clutch. In paragliders there is no shift device equivalent. A shift equivalent facilitates the positioning of one part in relation with a second part so as to enable the apparatus to perform more than one output of or internal change within the apparatus.

If paragliders had shift devices such devices would allow many novel actions including allowing the pilots legs and hands to form a combination such as one would find in a bicycle's manual clutch/gear shift transmission power train/linkage system.

The instant invention makes application to paragliders of pull-pull/pull-push cable systems. pull-pull and pull-push cables have a stiff outer sheath/conduit that does not move during functioning. There is an inner wire core (51a) freely movable inside the sheath. When properly installed these cables allow the user to pull something to or push something away from one end of the sheath from a point at the opposite end of the sheath. The two sheath ends may be six or more feet apart. These cables do not exert pressure on or scrape against anything outside the sheath between ends of the sheath. The control end can move freely about one end of the sheath and it can still effect the desired movement at the opposite end of the outer sheath. A common example is the cable system on bicycles.

SUMMARY OF THE INVENTION

Objectives of the present invention are to:

Provide a novel set of retention devices to retain the paraglider brake handles in positions that will greatly decrease the probability of wing collapse;

Provide a novel set of retention devices to retain in a lowered position one or more of the paraglider risers or suspension lines;

Provide a novel set of retention devices to retain in a lowered position the paraglider's outermost 2 suspension lines of each A riser on inflating the wing at launch to facilitate a continuing Big Ears at launch;

Reduce the time in the dangerous condition in which the hands are removed from optimum control of the paraglider brake loop handles to adjust risers or suspension lines;

Reduce the time in the hazardous condition in which the attention of the eyes are diverted from focus on the flight path to accomplish certain flight maneuvers;

Provide an apparatus to temporarily retain the brake handles in the optimum wing stabilization position, about 4 inches below the top of the shoulder, whenever the hands are needed for actions other than holding the brake loops;

Provide an apparatus to temporarily retain the brake handles in the optimum stabilization position, about 4 inches below the top of the shoulder, whenever the pilot wishes to shake out and rest his arm muscles from the task of holding down the brake loops;

Provide a device that reduces the time during flight that the brake loops are away from the optimum stabilization point when inducing desired wing tips collapse, Big Ears; thus, the pilot can continue forward movement while making a faster descents away from dangerous conditions;

Provide a device that reduces the time the brake loops are away from the optimum stabilization point when the pilot induces a desired B riser stall maneuver; thus, the pilot can descend more quickly out of dangerous conditions than with the Big Ears maneuver;

Provide for the paraglider pilot safe and novel methods for making specific changes in parts of the wing in addition to modifications of the overall shape. An example would be an attachment from the transmission box to affect only the C risers;

Provide a method for the legs to relieve the arms in pulling down on the brake handles;

Provide an alternate method, instead of using the hands, to affect the lift and speed on those paragliders with the trim tabs system;

Provide for the paraglider pilot an apparatus such that the leg power can be engaged with less effort or thought to the means for applying the leg power to paraglider parts;

Provide for the paraglider pilot a novel apparatus by which variations in wing configurations can be done quickly, easily and with measured increments while in flight;

Provide a new control system that will still allow all the functions in current paragliders to be carried out should any part of the instant system fail;

Provide an easier, more usable and novel way for the pilot to keep modulating the brake loops and the 2 outer suspensory lines of the A risers at the same time so as to facilitate spot landings, or so as at any time to decrease forward motion simultaneously with decreasing lift of the wing;

Provide a device that will allow for holding the speed system at the fastest configuration of the wing on launch;

Provide a visual facilitator for finding control parts of the paraglider;

Provide a basic system that will also serve as a back up system for the more complex embodiments of the invention;

Provide a graduation of control apparatus embodiments that may be incrementally added on to the related art basic paraglider depending on the interest and financial resources of the paraglider pilot;

Provide a stirrup linkage apparatus for linking of the leg power with a contrivance for facilitating this leg power to affect the paraglider;

Provide for the use of pull-pull and/or pull-push cables for facilitating control of the paraglider;

Provide a speed augmentation system to allow the leg power to affect quickly two parts of the paraglider during flight; and Provide a transmission box and shift system device for paragliders.

In accordance with the description presented herein, other objectives of this invention will become apparent when the description and drawings are reviewed.

BRIEF DESCRIPTION OF THE DRAWING

FIG. 5 illustrates the hand gear and the main embodiments of the Wing Tip Collapse Facilitator.

FIG. 5A illustrates another alternative embodiment of the Wing Tip Collapse Facilitator.

FIG. 5B illustrates a fourth embodiment of the Wing Tip Collapse Facilitator.

FIG. 21 illustrates an alternative embodiment of the transmission box with the top off.

FIG. 22 illustrates the spooling device and leg power linkage gear.

DESCRIPTION OF THE PREFERRED EMBODIMENT

The invention consists of changes to the paraglider so that there are new ways of controlling/modifying the paraglider. Very significant, the invention enables temporary retention of the brake loops (120) in a safe, optimum position as compared to current art and, in addition, the invention provides alternate ways to use the Big Ears and the Speed System found in current art. A variety of alternate configurations and combinations are possible as the invention involves modifications of all four of the main areas of the entire paraglider system.

Figure 1:
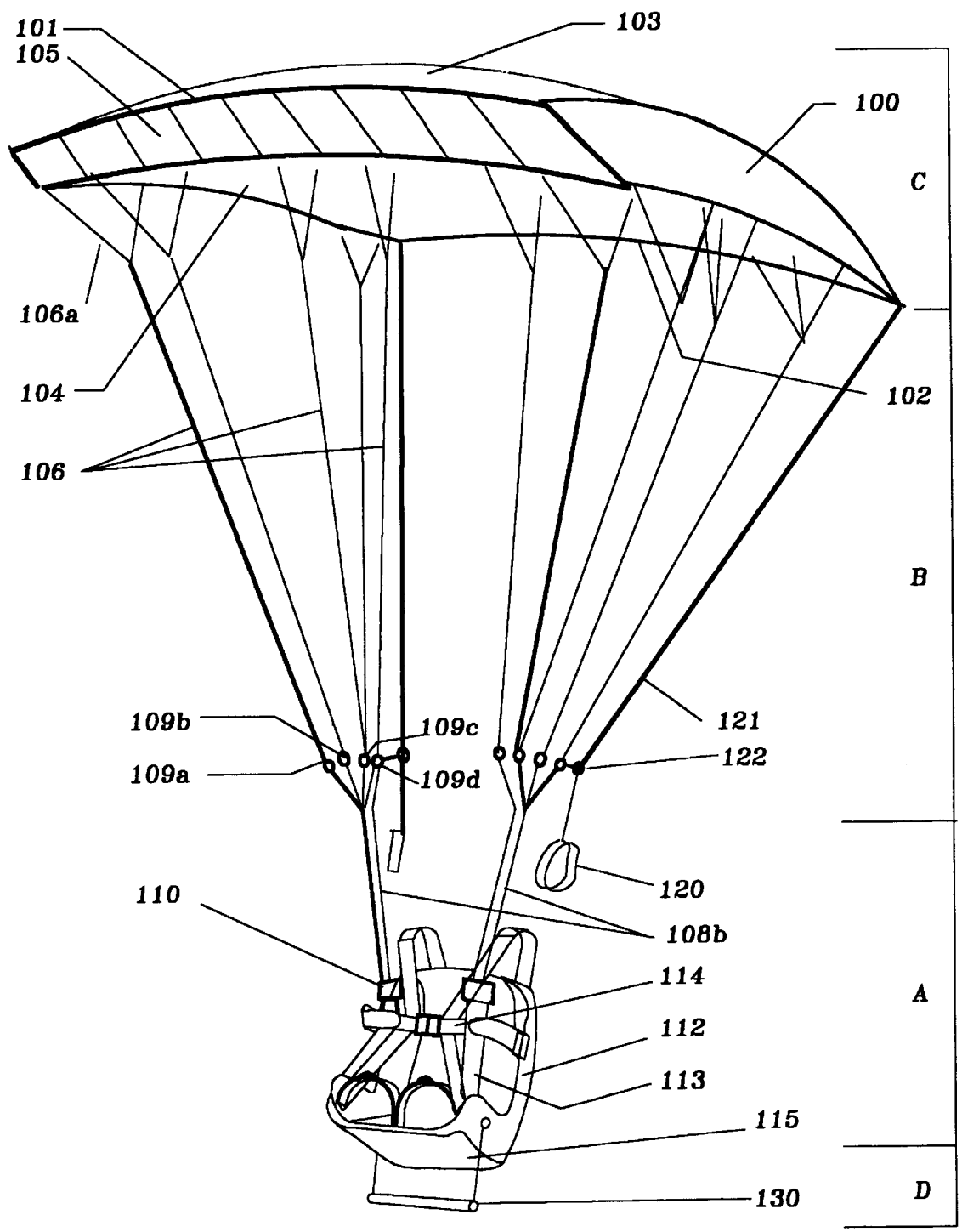
FIG. 1 illustrates a schematized paraglider.
Figures 2, 2A:
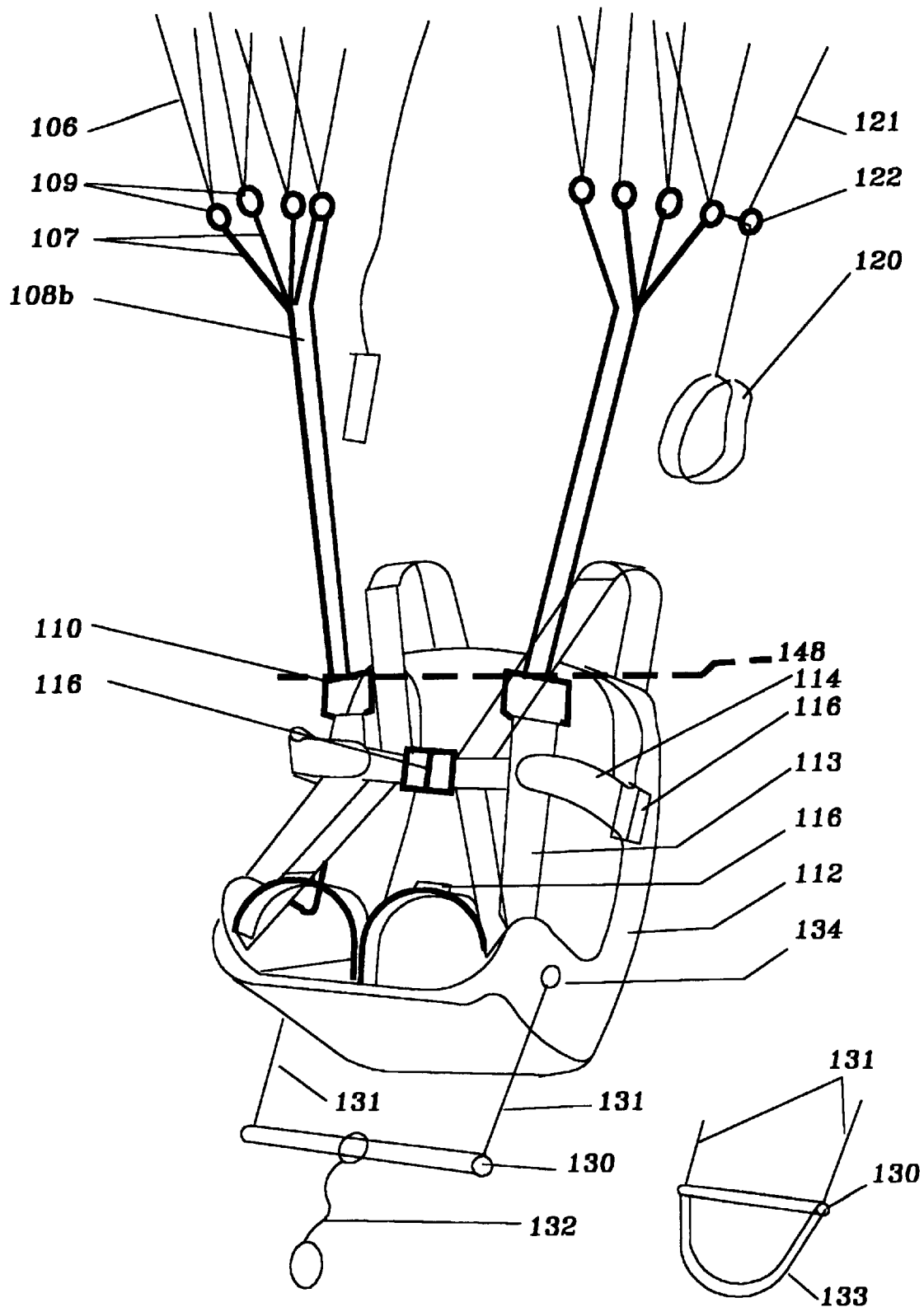
FIG. 2 illustrates a frontal view of a typical current use paraglider containing a pilot without the wing.
FIG. 2A shows an alternative stirrup.
Figure 3:
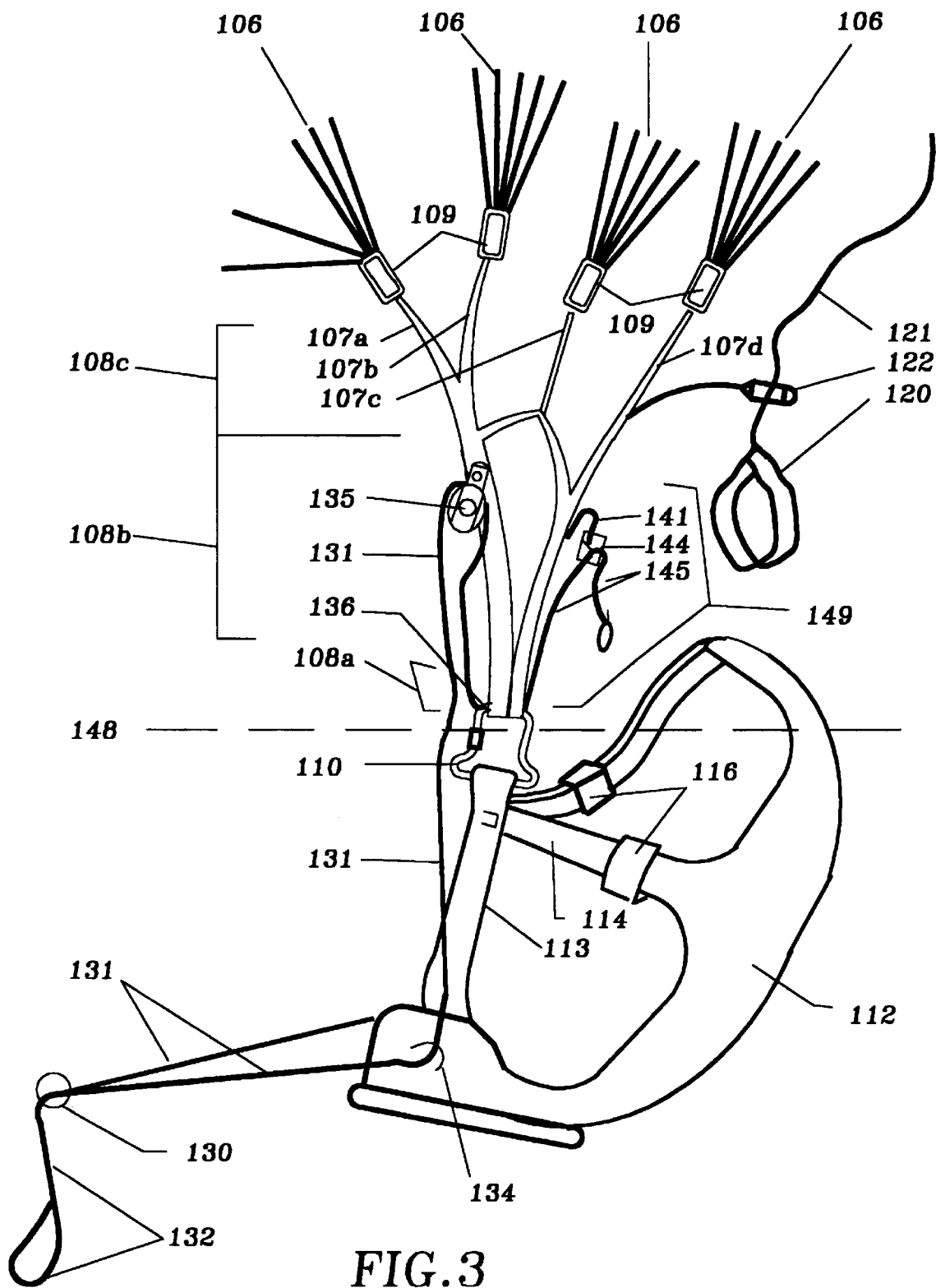
FIG. 3 illustrates a view of the left side of a typical current use paraglider without the wing.
Figure 4:
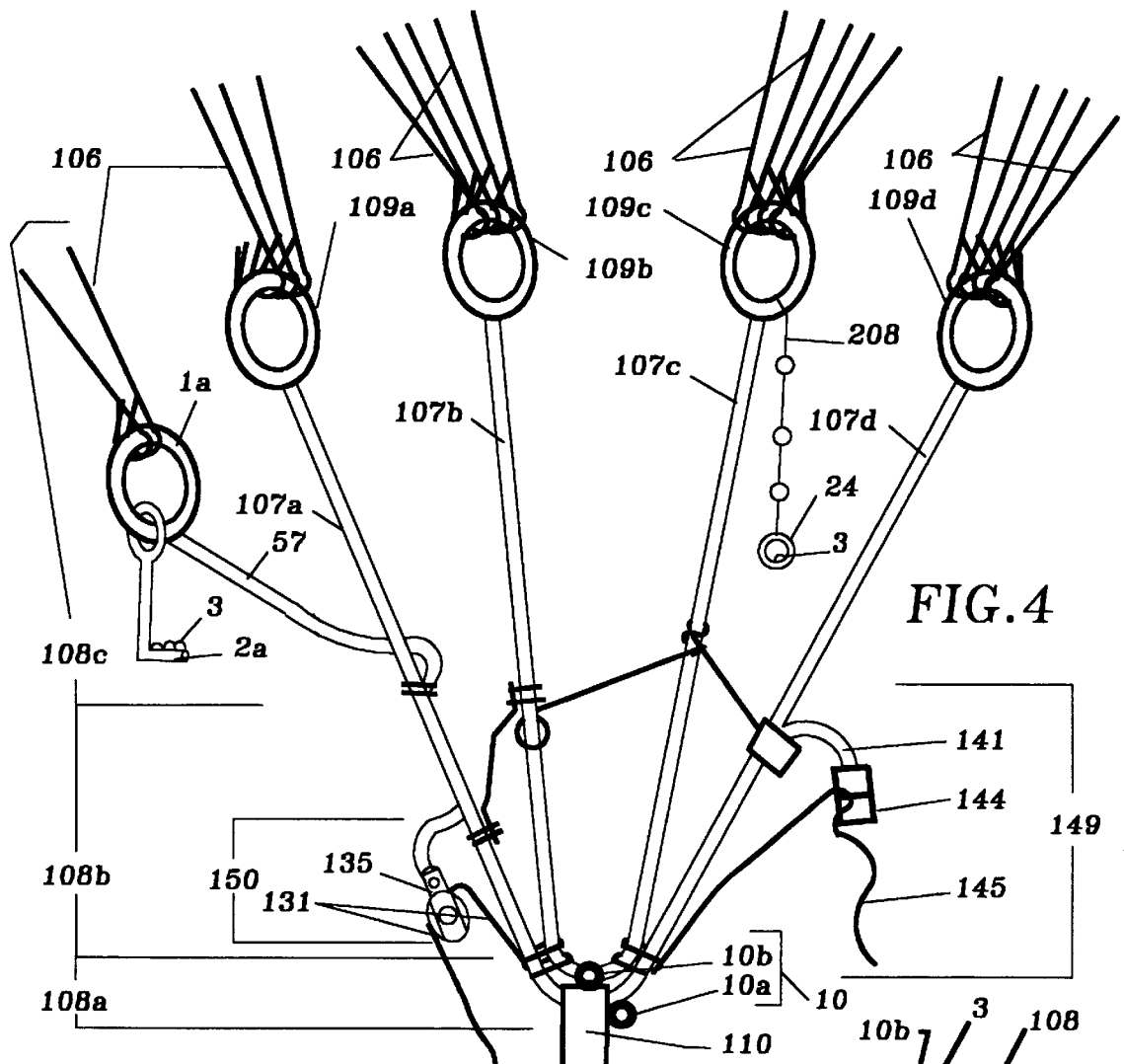
FIG. 4 illustrates the riser complex and an embodiment of the Wing Tips Collapse Facilitator.

FIGS. 1 through 3 illustrate a typical version of the current art of the paraglider with multiple suspension lines (106) that attach by means to a harness (112) with seat board (115). In this configuration there are brake lines (121) for control of the wing trailing edge (102) of the paraglider wing (100). The brake lines (121) pass through brake loop limiter (122) and terminate in brake loops (120) which are used in turn by the paraglider pilot to control flight aspects.

FIG. 2 further illustrates a current art control construction for changing the shape of the wing leading edge (101) surface of the paraglider wing (100) by the use of a speed stirrup (130), as discussed above.

A. Additions to the Wing Suspension System and Brake Loop

Referring to FIGS. 4, 5, 6, and 7, there are many elements to the present invention from which a pilot can initially choose to use just one part and gradually add on. The wing suspension retainers (10a & 10b), grasping tails (208) plus other modifications will provide many advantages over current art. This is so even if the pilot does not chose to adopt the more complex embodiment; thus, the basic system works without the transmission box (60), hub handle bars (50) and levers/gears (52–54).

For example, the basic system provides, when performing wing tip collapse and B riser stall, that the pilot's hands will not be off the brake loops (120) more than 3 seconds; at the same time the brake loops (120), placed in the lower wing retainer (10a), will be kept in optimum position (148) for wing (100) stability while the hands are off the brake loops (120).

The basic system can be used to perform wing tip collapse automatically on launch. One does this by hooking the A riser ring (7) into the upper wing retainer (10b) before inflation, when the wing (100) is still on the ground. This permits a safer launch when for example the lifting air is too strong. This invention's basic system will also serve to provide back up devices should hand gears (50–53) and/or transmission box (60) fail.

The basic system invention depends on the stabilization and retention wing suspension system (10). The stabilization and wing retention system (10) is a hook like means which acts to temporarily retain brake loops (120), or other paraglider parts, without being held with the hands.

The main stabilization and retention systems are attached in positions recommended by each manufacturer as ones that permit stabilization of the wing (100). These positions (148) are usually between the top of the shoulder and about 4 inches below the top of the shoulder of the pilot. The features of the stabilization and retention wing systems include allowing the brake loops (120) to be instantaneously retained and disengaged by the pilot with at least one stabilization and retention wing suspension system (10) preventing the brake loops (120) from being pulled by the wing (100) in the opposite direction of gravity and providing a temporary attachment means for one part of the paraglider onto a different part of the paraglider, retention harness, or pilot.

Figures 9, 10:
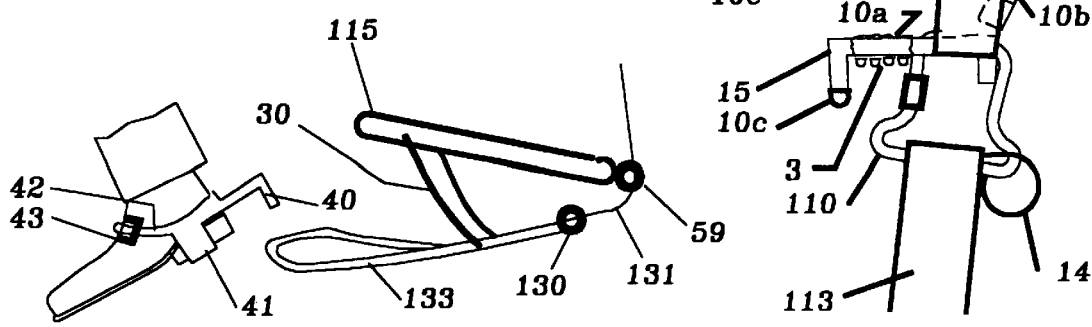
FIG. 9 illustrates the elements of the speed stirrup system.
FIG. 10 illustrates the wing suspension retainer at the main carabiner quicklink.
Figure 6:
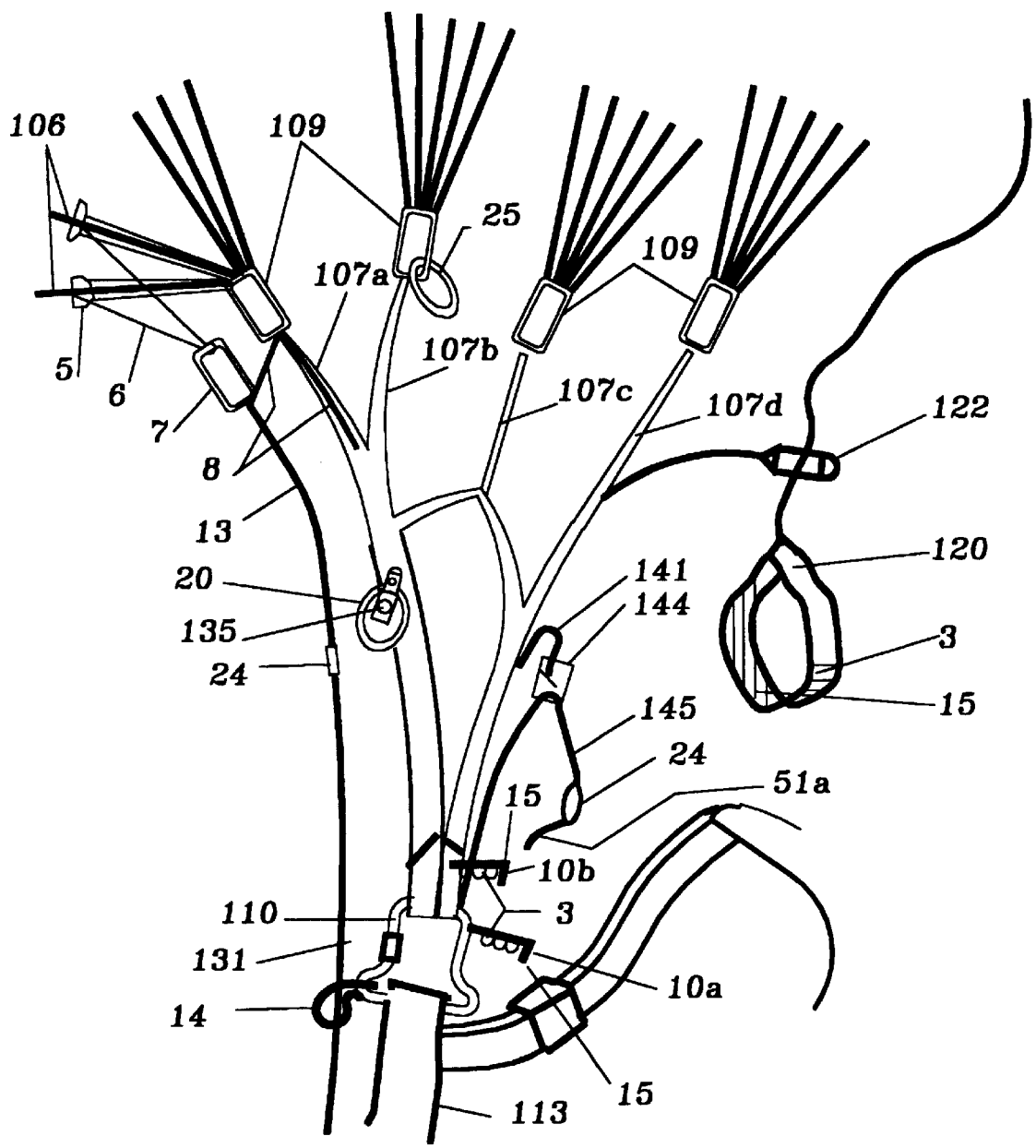
FIG. 6 illustrates the basic system with A riser speed stirrup cord (131).

In the FIGS. 6 and 10 the stabilization and retention wing retention system (10) includes a set of four bracket like hooks, the wing suspension retainers (10a and 10b). The two lower ones are placed in the lowest part of the loop of main riser (108). They should be attached to a strap of the main riser (108) and main carabiner quicklink (110) so as to be angled toward the pilot with the hook part facing laterally. The lower wing retainer (10a) should allow a space of at least 1 inch into which the brake loop (120), or other parts, can nestle.

The horizontal element of the wing suspension retainers (10a and 10b) are wrapped with a mating portion of a hook and loop (3) retainer. The purpose of the hook and loop (3) means on flight controls is to retain mating elements to hold various paraglider parts into other paraglider parts during severe turbulence and during launch, when the tugging pressure of the wing parts may not be sufficient to hold in the brake loop (120) or other part.

All the invention parts involving hooks may use this hook and loop (3) device.

The lower wing suspension retainers (10a) have other surfaces wrapped in tape (15) a color the same as on brake loop (120) and different than used on other elements. The upper wing retainers (10b) have non hook and loop surfaces wrapped in the colors of A riser ring (7). This helps quick and rapid identification so the hands will be off the brake loops (120) in the shortest time possible.

The upper wing suspension retainers (10b) will be attached onto main riser (108a) 1½ to 2 inches above the lower wing retainers (10a) and the upper wing retainers (10b) will also be angled laterally and slightly anterior instead of the slightly posterior angle as with the lower wing retainers (10a). All the wing suspension retainers (10) must be attached firmly enough to remain horizontal under the pressure, 10 to 80 pounds, when various parts (120, 20, 7, 25, etc.) get hooked into them.

The optimum wing suspension retainer (10) form will be as smooth surfaced as feasible so as to reduce abrasion and to reduce snagging. The ends are cushioned by cap (10c). The upper wing suspension retainer (10b) is 2½ inches long and the lower wing suspension retainer (10a) is 3 inches long. Wing suspension retainers (10) are of more value when there are more elements of importance to hook into them besides brake loops (120).

Figure 7:
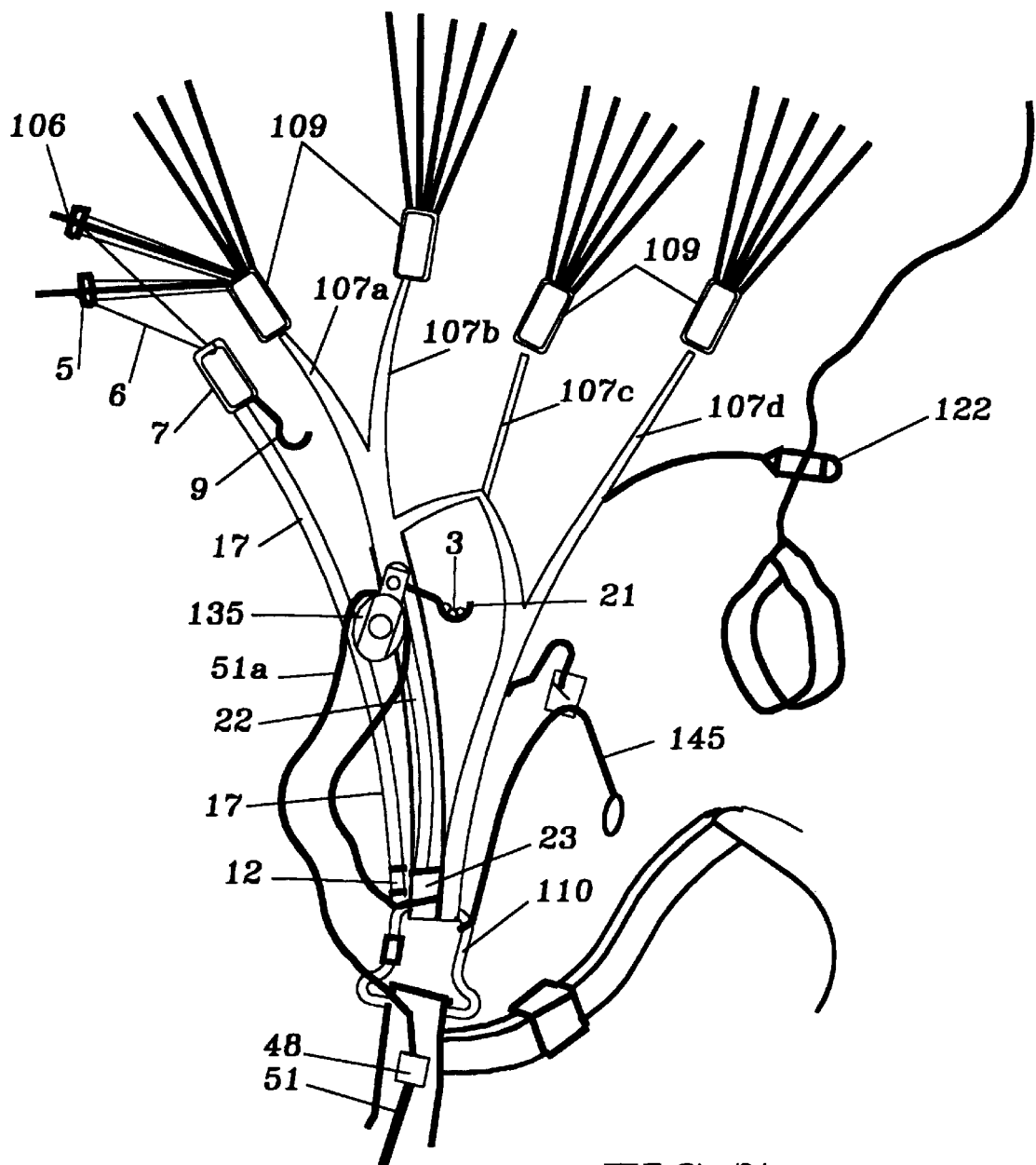
FIG. 7 illustrates the basic system with straps and buckles.
Figures 8, 8A:
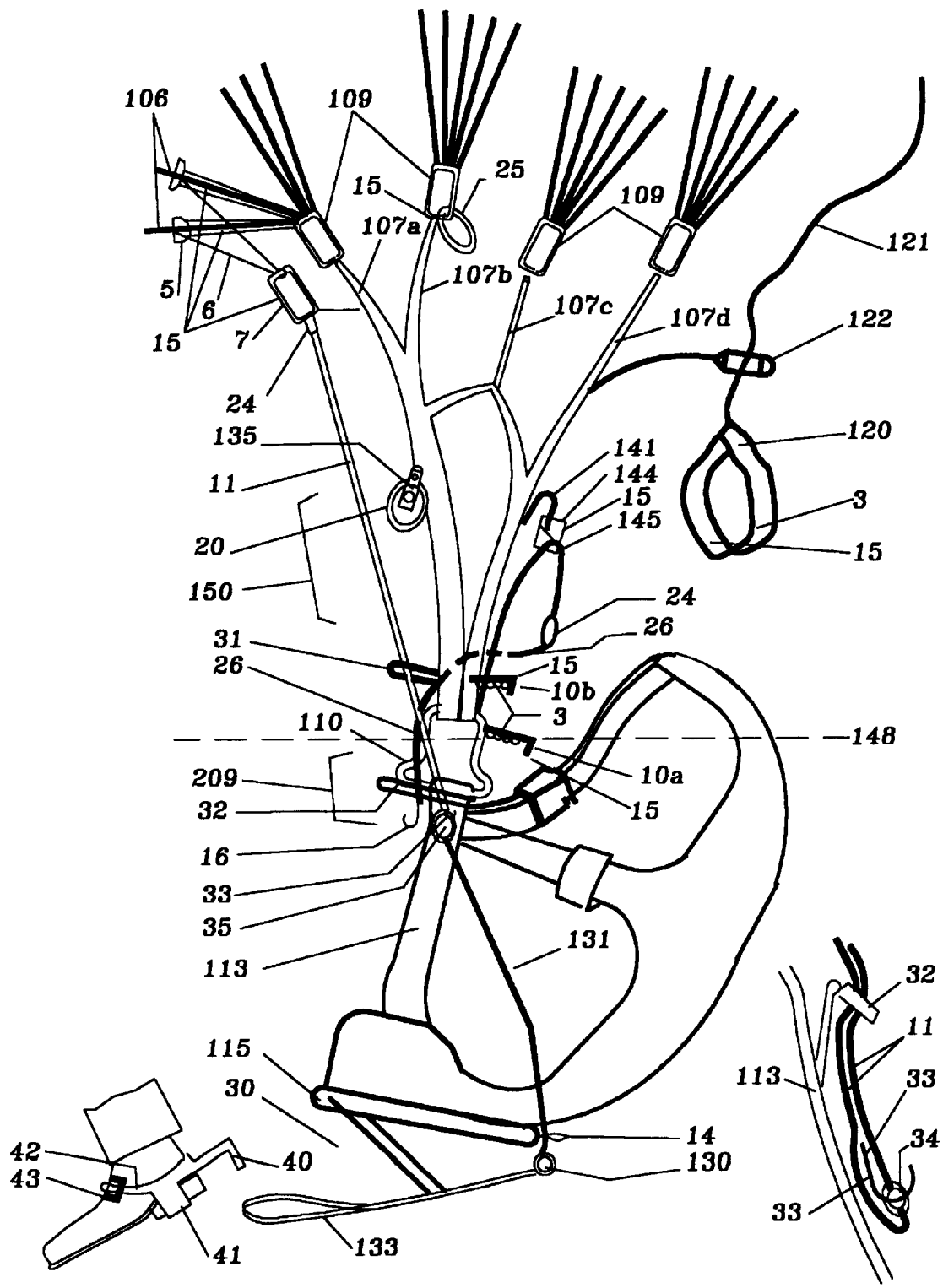
FIG. 8 illustrates the basic system and speed augmentation system.
FIG. 8A illustrates details of most of the hook systems especially the speed augmentation system.

FIGS. 6, 7, and 8 show a system without transmission box (60) or levers (50–54). The basic system includes an assemblage of at least six components attached to the paraglider. Below mentioned components 1, 2, 5, 6, 7, 15 and part of 4 could be used alone and still provide significant advantages over current art.

Component 1: the wing suspension retainers (10).

Component 2: A riser trim line quicklink (7), A riser tubes (4), riser clips (5), and various attaching parts.

An A riser trim line quicklink (7) has about a 1½ inches base and is suspended at the level of the A riser's (107*a*) carabiner quicklink (109). The bottom half of the A riser trim line quicklink (7) is wrapped with hook and loop material (3). The top part of A riser trim line quicklink (7) is wrapped with appropriately colored tape (15). Helping to keep the A riser trim line quicklink (7) in place is an A riser elastic strap (8) of about 4 inches length with one end attached to the A riser trim line quicklink (7) and the other to a point below on A riser (107*a*).

A cord (6) of at least 80 pounds breaking strength is attached to the A riser trim line quicklink (7) and to a ⅛ inches diameter riser clip (5) placed around a taped, or other soft protective means, spot on each of the 2 outer wing suspension lines (106) of the A riser (107*a*) on each side of the pilot. This taped spot needs to be about 7 inches above the A riser's (107*a*) carabiner quicklink (109). The A riser suspensory lines are attached to the carabiner quicklink (109). The tape on these lines will cover about 1 inch of the wing suspensory line (106) in such a way as to protect the them from rubbing against the lip of the A riser tube (4) and riser clip (5).

A ¼ inches diameter light weight A riser tube (4), about 7 inches long, is placed between the taped spot on wing suspension line (106) and the carabiner quicklink (109). A grommet placed in each end of the A riser tube (4) will protect both tube and wing suspension line (106). Each of the two outer wing suspension lines (106), of the five suspensory lines (106) on A riser (107*a*), passes through its own A riser tube (4). This prevents the riser clips (5), to A riser trim lines (6) from A riser trim line quicklink (7) to wing suspension lines (106), from slipping down toward carabiner quicklinks (109). Such slippage would render ineffective the pull on the A riser trim line quicklink (7) to make Big Ears. Without the A riser tube (4) the pilot cannot perform wing tip collapse with a straight downward exerted force.

Another embodiment, FIG. 5B, shows the trim lines (6*b*) attached to link (7) and passing through tubes (4) to attach to the A riser carabiner quicklink (109). This system does not use clips (5).

Experiments where conducted with the following embodiments 1 through 3:

Embodiment 1. FIG. 5 illustrates this simple embodiment using an A riser ring (1). The A riser ring (1) is placed around the two outer A riser (107*a*) wing suspension lines (106). Attached to the A riser ring (1) is a 2 inch bracket like hook, the A riser ring hook (2), with a soft cap (10*c*) and hook and loop (3). The hook and loop (3) mating element is placed on main carabiner quicklink (110). Appropriate colorizing (15) is done. This embodiment is used by grabbing the A riser ring (1), pushing laterally, then pulling down, and then hooking the A riser ring hook (2) into the main carabiner quicklink (110). If an A riser ring (1) with an A riser ring hook (2) is used alone, one would want to place a strap tail of about 6 inches hanging from the A riser ring (1) to make it easier to locate and grab onto it.

Embodiment 2. In this case, see FIG. 4, the two outer wing suspension lines (106) are attached to a supplemental A riser quicklink (1*a*). This in turn is attached to a suspensory supplemental A riser (57). This supplemental A riser (57) is attached to the back of the A riser (107*a*). A supplemental A riser hook (2*a*) can be attached to supplemental A riser quicklink (1*a*) similar to the construction and idea behind A riser ring hook (2).

Embodiment 3. See FIG. 5A. In this configuration the means to attach, or connect, the equivalent of A riser trim line quicklink (7) is to use two supplemental trim lines (6*a*). These supplemental trim lines (6*a*) attach at one end to a quicklink (7) equivalent, and at the other end to the same attachment points as the A riser (107*a*) two outer wing suspension lines (106) where the wing suspension lines (106) attach to their respective supplemental suspension lines (106*a*) about 4 feet below the wing (100) as in FIG. 1.

The Launch Facilitator is comprised of the wing suspension retainers (10) and the wing tip collapse (Big Ears) facilitator (3, 4, 5, 6, 7, 8, 9, and 15), or alternatives.

Component 3: This component is comprised of the B rings (25) on the B risers (107*b*) with hook and loop (3) and visual indicators (15) to produce B riser stall, very rapid descent.

The B riser (107*b*) carabiner quicklink (109) will have a 2 inch metal circle B riser ring (25). This is placed around the carabiner quicklink (109) of the B riser (107*b*). The bottom of B riser ring (25) is wrapped with hook and loop (3) and the top part is wrapped with a tape (15) of a different color than on A riser ring (7). After the pilot hooks brake loops (120) into wing suspension retainers (10*a*), the pilot hooks the B riser ring (25) into upper wing suspension retainers (10*b*) to hold down the B riser wing suspension lines (106) as long as wished. Then, the hands take the brake loops (120) out of lower wing suspension retainers (10*a*)to return to optimum management of the brake loops (120).

Component 4: This element involves changes in the brake loop (120) as better seen in FIG. 6. The brake loop (120) is modified by wrapping the part facing the hand with hook and loop (3) material. This allows secure retention by the wing suspension retainers (10*a*, 10*b*). Brake loop (120) is also colored by tape (15) or other means of the same color as on the lower wing suspension retainers (10*a*).

Finally, either component 5 or component 6 is used with above component 4.

Component 5: If the paraglider has a trim tab system (149), then the speed stirrup (130) and speed stirrup cords (131) are attached to the A riser trim line quicklink (7), Big Ears system. In this embodiment, the pilot's legs are used for the power to pull on A riser trim line quicklink (7) to change outer A riser (107*a*) and forward two A riser wing suspense lines (106) to cause wing tip collapses. Component 5 requires the use of ADD ON I, see below.

Component 6: The Launch Expediter I is an A riser speed system quicklink (20) on the A risers (107*a*) pulley (135) loop area with modifications (3 and 15). The A riser speed system quicklink (20) is used if the speed stirrup system (150) is used instead of the trim tab system (149).

A problem with the speed stirrup system (150) is the inability to obtain the faster flying wing on take off because the speed stirrup system (150) can't be held without constant input from the legs. To remedy this, the A riser speed system quicklink (20) is placed in the current art loop attaching pulley (135) on each A riser (107*a*). The A riser speed system quicklinks (20) are wrapped on the lower half with hook and loop (3) and on the upper half with a tape (15) the same color as with A riser trimline quicklink (7). This is used with the wing suspension retainers (10*b*) similarly to the use with the A riser trim line quicklink (7) for obtaining Big Ears on launch; thus, the pilot can obtain the fastest flying ability of the wing (100) so as to launch in higher winds. Hooking in of A riser speed system quicklinks (20) is done preparatory to launch; thus, both hands are available.

In another embodiment, Launch Expediter II, no wing suspension retainer (10) system is used. For example, in FIG. 7 an appropriate riser speed system loop hook (21) is attached to the point on the A riser (107a) where the speed system pulley (135) is attached. All one has to do is connect the hook to the main carabiner quicklink (110) to obtain the advantage of the fastest speed configuration for launch. The hook and loop (3) is also used here as well as color (15).

Figure 11:
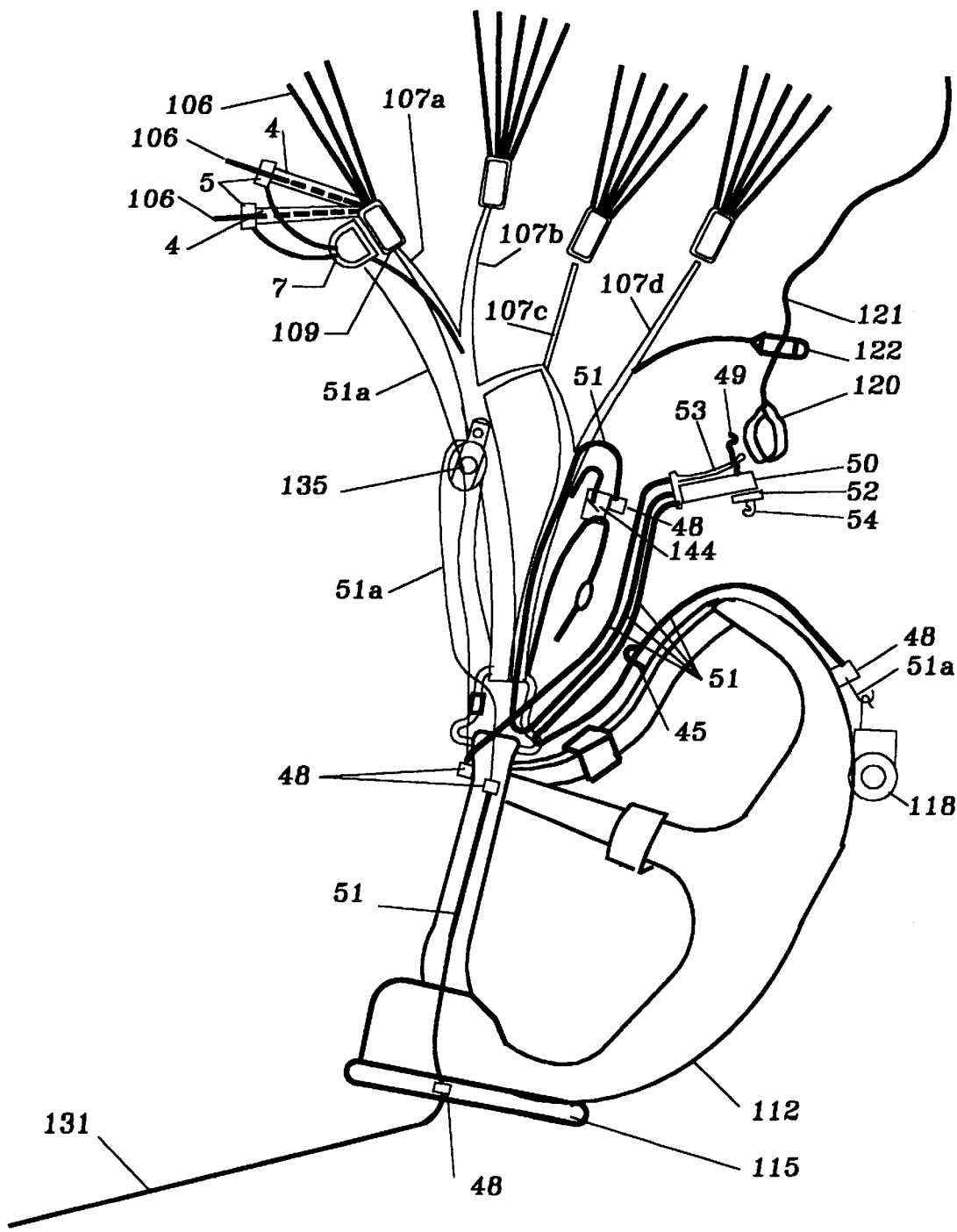
FIG. 11 illustrates a left side view of the basic system plus handle bar with gear directly to the Big Ears system, gear to trim tab system and gear to the rocket.

This invention includes use of a pull-pull sheathed cable (51). Use of such sheathed cables (51) could be independent of the other control means disclosed herein. As illustrated in FIGS. 7 and 11, the sheathed cable (51) would have conduit stops (48) at each end of vertical harness strap (113) from main carabiner quicklink (110) to seat board (115). The inner wire (51a) would substitute for speed stirrup cord (131) thus replacing current art speed stirrup cord (131) which gets in the way and scrapes against parts of the paraglider.

Component 7A: This is the use of Grasping Tails. See FIG. 4, numeral 208, for an example on the C riser quicklink (109C). Essentially a grasping tail is a flexible means that enables the pilot to grasp onto some part of the suspending lines and risers so that the pilot can influence the part of the paraglider without moving his hands as much as he would have to move the hands if he did not have the grasping tails. The purpose is to facilitate the pilot being able to keep his hands on the brake loop (120) so the brake loop (120) can be optimally positioned. Usually a grasping tail will be a knotted cord at least 5 inches long and colored with a visual facilitator to match the part the pilot wishes to affect. Of course, there is no limit to the number of grasping tails that can be placed on strategic parts of the suspensory basic area of the paraglider.

B. The Speed System Take Off Facilitator

If a pilot wished to use only that aspect of the instant invention so as to provide his speed system type of paraglider with an equivalent to achieve both reduced lift and the fastest wing speed on launch, then the pilot would use some form of the Speed System Take Off Facilitator. FIG. 7 shows two configurations. Take Off Facilitator I comprises a Wing Tip Collapse Facilitator equivalent, two riser harness loop straps (17 and 22) and two simple riser harness loop cam buckles (12 and 23) on each side. The end of one riser harness loop strap (22) is attached at speed stirrup pulley (135) on A riser (107a) and the other end passes through a speed system cam buckle (23). The speed system cam buckle (23) is attached at about the spot where the final termination of A riser speed stirrup cord (13) is on the A riser (107a). The second speed system strap (17) has one end attached to the Wing Tip Collapse Facilitator equivalent and the other end passes through a second speed system cam buckle (12) attached next to the first buckle (23).

Take Off Facilitator II embodiment would simply attach an appropriate A riser trim line hook (9) onto A riser trim line quicklink (7) and attach speed system hook (21) at the speed stirrup pulley (135) on the A riser (107a). At launch, one would simply hook these two hooks (9, 21) into the top of main carabiner quicklink (110), etc. Hook and loop means (3) are used as before for attaching parts.

Hooks (9, 21) would replace the wing suspension retainers (10a, 10b) and the speed system quicklink (20) if the pilot just wishes to have only these two functions added to his paraglider.

A pilot may just wish to buy the basic system and never involve the transmission box (60) or hand levers/gears (50–53).

The maximum length the pilot's leg is permitted to pull down any part of the wing (100) may be limited by putting an obstruction between an actuating point and a conduit stop (48). For example, if the manufacturer recommends no more than 17 inches to pull down the two outside A riser (107a) lines to produce Big Ears, then one puts in a loop or other means on the A riser (107a) 17 inches down from the lower curve of A riser ring (7).

C. Visual Facilitator for Finding Paraglider Controls

This apparatus should be used with all forms of paragliders even without any other parts of the instant invention. Hopefully, the international paraglider organizations will decide soon to make a decision for an international uniform minimal standard for the colored patterns of vital control parts. Also it is recommended that any coverings of the pilot's body are muted dark gray.

The optimum full Visual Facilitator comprises at least two pieces of the paraglider assemblage which are located within 4 feet of the pilot's chest. These assembles or parts must be deliberately made to have a certain visual configuration so that any particular part is in one of two categories: 1) Category One: If said part is one of functionally related flight control parts, then that control part is distinctively and singularly brightly colored and patterned; or, conversely, Category Two: If a paraglider part is not a control part it is drably non-eye-catching. Of course, even if just the brake loops (120) alone were a unique bright color such would help visually facilitating control. Brake loops (120) often come in a drab black.

Listed above are the important control areas that the pilot must find easily. Therefore these areas must not use both red and green and other patterns should be used besides colors. Non-important areas should be a solid drab gray. Optimally, materials rendering color are durable and fade resistant and materials can be paint, dye, tape, or essentially integral, i.e., resulting from color added when the piece of hardware was originally manufactured.

For example, FIGS. 8 and 10, the Visual Facilitator (15) would comprise:

a. Day-Glow Orange brake loops (120) and lower wing suspension retainers (10a);

b. vermilion red and white vertically striped top 2 inches of the A risers (107a) and the first 8 inches of the 2 outer wing suspensory lines (106) of the A risers (107a), also related Wing Tip Collapse Facilitator (1, 3, 4, 5, 11, 15), and finally, upper wing suspension retainer (10b);

c. deep violet and white horizontally striped lower trim tab D riser straps (26), trim tab jaw clamp (142), and attached strap (145);

d. bright blue and white dotted top 1 inch of the B risers (107b), its carabiner quicklink (109) and B riser ring (25); and e. if the hub handle bar (50) add-on is used, FIG. 5, hub handle bars (50) would be checkered brown and chromium yellow.

All other parts nearby are muted dark gray.

D. Devices for the Legs

ADD-ON I

The Stirrup Linkage Facilitator (40, 42, 43).

The pilot's foot/leg is used in those instances where a speed stirrup system (150), similar means, or a leg powered transmission box is used. Thus, for optimum functioning of the paraglider a clutch device equivalent may be used to facilitate connection of a paraglider pilot's shoe to a speed stirrup system (150) or similar system.

To do so, a Stirrup Linkage Facilitator has been invented which consists of the five parts illustrated in FIG. 9 (30, 40, 41, 42, 43). Slipped over the shoe is a 1 inch wide foot garter (42) strap adjustable by a foot garter buckle (43). Foot garter (42) strap passes through looped heel strap (41) about 2 inches wide. An approximately 5 inch long by 1¼ inch high sturdy foot hook (40) is placed within the loop of heel strap (41) and attached to foot garter (42). The foot hook (40) will be so placed so that the bottom of the hook will be about ¼ inch above the bottom of the shoe's heel. It will stick out about 1¾'s inch from the heel.

Referring to FIG. 9, elastic bands, speed stirrup retainer cords (30), about 7 inches long will be attached to the sides of the seat board (115) and to the upper third of cord stirrup tube (133) to keep the speed stirrup (130) in position for being engaged with the foot, yet out of the way. Pieces are arranged so that the bottom of cord stirrup tube (133) hangs 12–14 inches below seat board (115) and 1–2 inches forward of the front part of seat board (115), rather than the current position of speed stirrup (130) about 13 inches below the middle of seat board (115).

It is recommended that this ADD-ON I be used with the basic system and all add-ons. One may not need it however if one has a paraglider with the speed stirrup system and one adopts only the Basic System.

Figure 15:
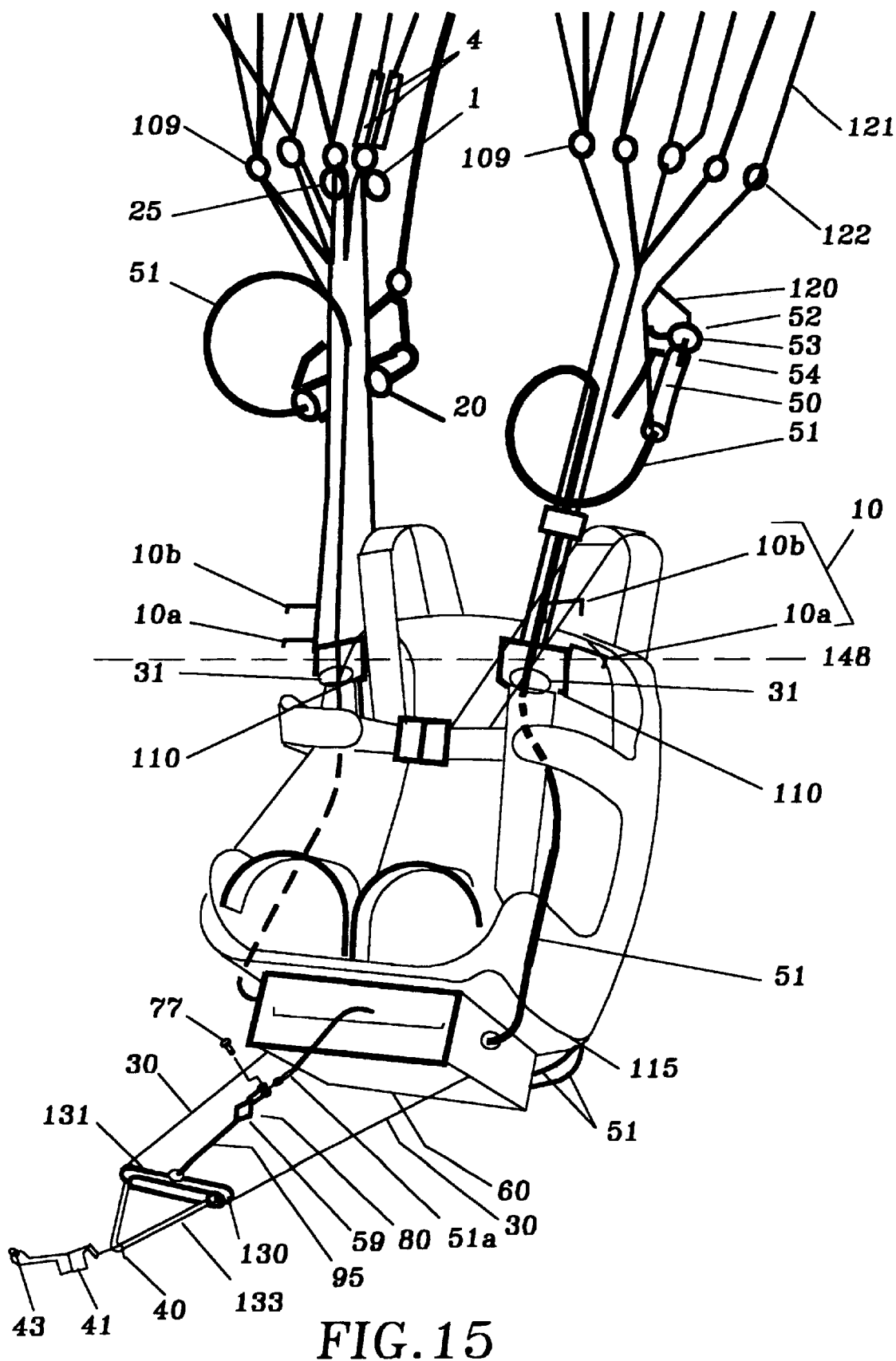
FIG. 15 illustrates a front perspective view of the suspension and attachments of the hub handle bar, the wing suspension retainer devices and transmission box below the seat.
Figure 19:
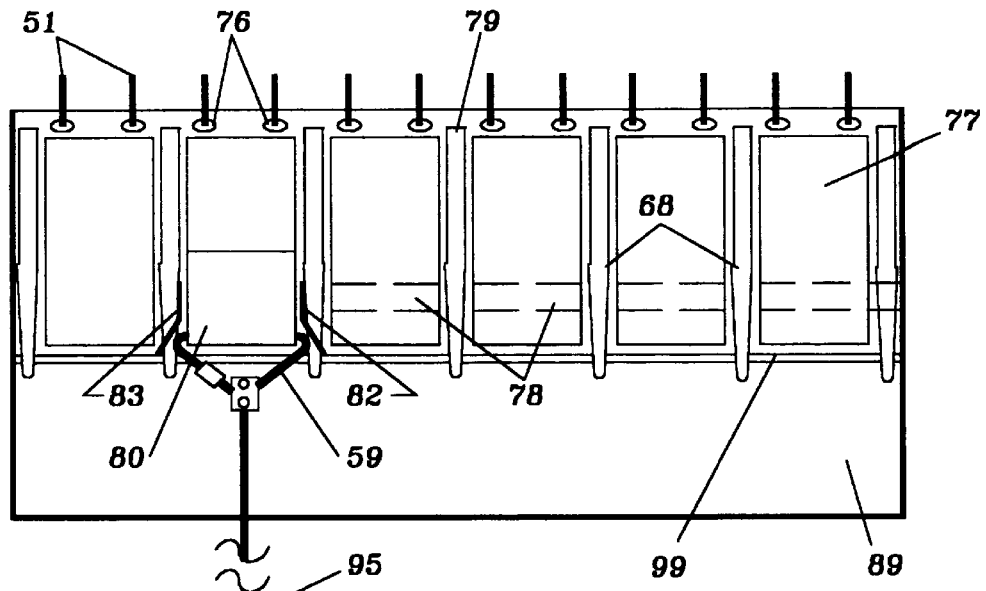
FIG. 19 illustrates a top view of the function switching and expansion elements of the transmission box without the top.

Referring to FIG. 15, when the speed stirrup (130) is used with ADD-ON III (60, etc), the speed stirrup cords (131) coming up from the speed stirrup (130) are vastly shortened and are united just above the speed stirrup (130). Speed stirrup cords (131) proceed as a single connection power tackle line (95) of 2 inches to connect up with the triangular link (59) then C bracket connection (80) of the transmission box (60). FIGS. 15 and 19 show a power linkage system.

ADD-ON II

The Speed Augmentation System

Referring to FIG. 8, a pilot may choose to provide for greater use of his legs in flight by using the Speed Augmentation System. The pivotal basis of Speed Augmentation System is a hook and ring clutch and gear shift equivalent system, which system allows switching quickly the speed stirrup cord (131) from being connected to either: (a) the A riser trim line strap (11), or (b) speed system trim tab straps (26). However, if the paraglider has this speed system instead of trim tab straps (26), then there would be a strap (not shown) that would run from the pulley area (135) to a hook under stop ring (32).

The Speed Augmentation System's hooks (16,33), ring (35) and buckle shaped apparatus (32) are located at (209) on each side just below the main carabiner quicklink (110). The speed augmentation system includes 20 parts. There are 2 speed augmentation rings (35) of 1½ inch inner diameter. Speed Augmentation rings (35) are attached to the speed stirrup cord (131) proceeding to the speed stirrup (130). Speed augmentation rings (35) can be connected and disconnected at will to one of the 2-per-side narrow steel wire speed augmentation hooks (16, 33) that can take 1 inch wide straps The speed augmentation hooks (16, 33) have a breaking strength of 500 pounds. Speed augmentation hooks (16,33) are looped by and sewn into A riser trim line straps (11) and riser harness loop straps (26) as illustrated in FIG. 8A. A hole is punched through the straps (11, 26) and the hole is protected by an eyelet (34).

Straps (11, 26) are in the form of a continuous loop one inch wide. The surfaces of strap (11, 26) loops are as slick as possible and somewhat stiff so that they do not twist upon going through the speed augmentation system stop rings (32). Breaking strength of the looped straps (11, 26) must be at least 300 pounds. At the other ends straps (11, 26) are looped by two 1 inch quicklinks (24) per side.

Quicklinks (24) are attached to an existing system, namely, one to the A riser quicklink (7) for inducing Big Ears and one to the trim tab strap (145). If the paraglider model has a speed system (150) instead of a trim tab apparatus, a quicklink (24) can be attached to speed system (150) in the A riser area, similar to that shown in FIG. 3 Specifically it can be attached to that part of speed stirrup cord (131) just before the cord passes through the speed system pulley (135).

A 1/16 inch wide hook and loop (3) strip is placed at the bottom of speed augmentation hooks (16, 33). Hook and loop (3) mating material is wrapped around the top half of speed augmentation system ring (35). The hook and loop (3) helps the ring stay in the hooks yet lightly enough that the speed augmentation ring (35) can be twisted to the side out of the light weight speed augmentation system hook (33) and leave the hook behind.

Straps (11, 26) pass through a 2 inch rectangular loop/ buckle speed augmentation system stop ring (32) with an opening of about 2 inches by no more than ¼ inch for straps (11, 26) to pass through. These keep the speed augmentation system hooks (16, 33) in an area easily findable and switchable, and keep the hooks facing outward. The speed augmentation system stop ring (32) is attached right below the main carabiner quicklink (110). This is part of the speed augmentation system (209) that functions as clutch and shift assisters; thus, these facilitate connecting and disconnecting, and repositioning among three parts so that new control is produced.

An additional speed augmentation system guide ring (31), or cloth loop, needs to be attached on main riser complex (108a) facing forward and just below the level of the upper wing suspension retainer (10b). The strap (11) to Big Ears A riser ring (7) goes through speed augmentation system guide ring (31) to keep A riser trim line strap (11) out of the way of the wing suspension retainers (10).

With most paraglider harnesses a pilot will have to change the passage of speed stirrup cord (131). See FIG. 8. In contrast, in FIG. 3, one sees that the cord passes straight down. On most models of harnesses a cord loop (134) or pulley is located at the middle or front of seat board (115). When there is a hand deployed reserve parachute its opening is along vertical harness strap (113). To prevent the speed augmentation system from rubbing here speed stirrup cord loop (134) for speed stirrup cord (131) must be placed to the very back of seat board (115) so that speed stirrup cord (131) does not rub along the area of the opening for the parachute (118) which is along the course of vertical harness strap (113).

A final component is suspending the speed stirrup (130) from the front of seat board (115) by an elastic means speed stirrup retainer cord (30). This allows the speed stirrup (130) to dangle below seat board (115) should both the speed augmentation system rings (35) come off. Speed stirrup retainer cords (30) also keep the cord stirrup tube (133) positioned forward to be more easily snagged by foot hook (40).

During very strong winds at launch the pilot will probably need to start with the speed stirrup cord (131) hooked into the hook and strap leading to the Big Ears A riser ring (7) by the A riser tim line strap (11). With moderate winds the pilot will probably prefer to start by hooking up the speed augmentation system ring (35) to the speed system (150) or the trim tab system (149).

ADD-ON III

Device to Permit the Legs to Perform more than Two Functions, the Transmission Box.

Figure 18:
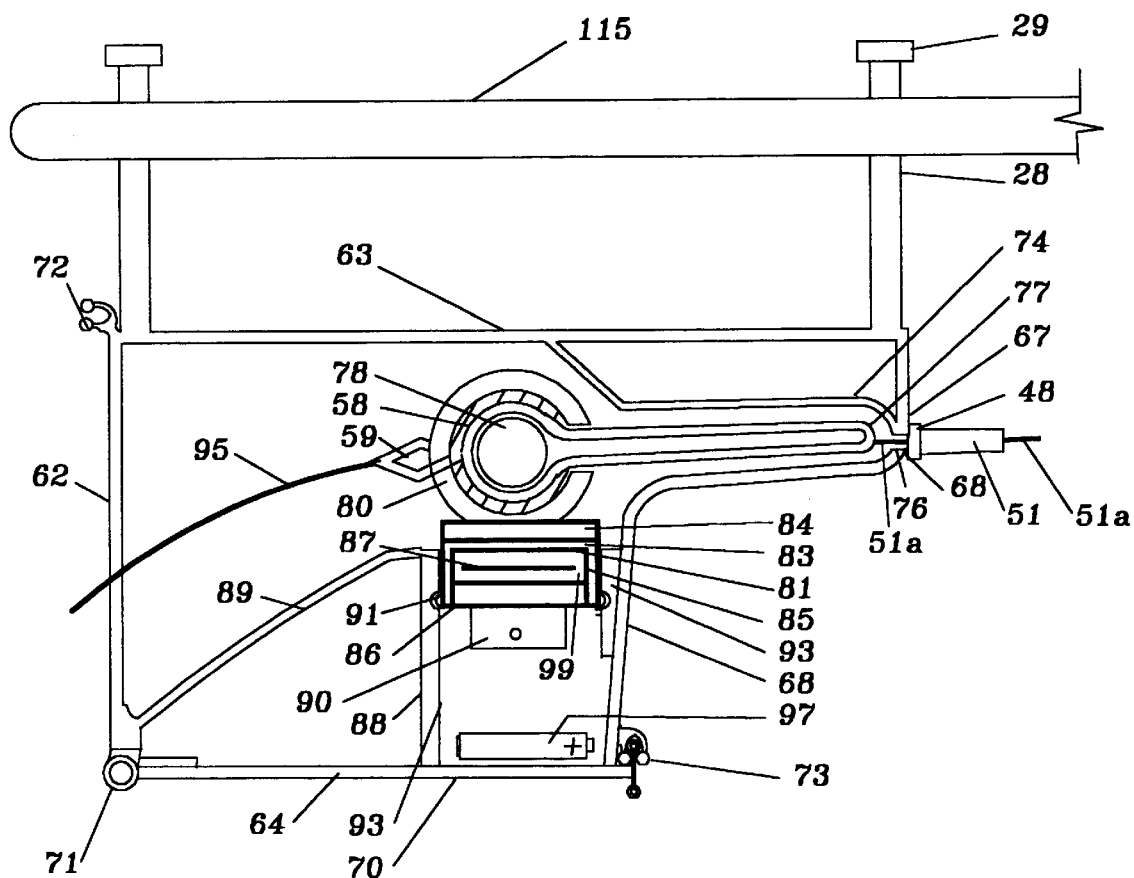
FIG. 18 illustrates a side cross sectional view of the preferred embodiment transmission box.

Referring to FIGS. 18 through 20, the preferred transmission box (60) system consists of straps, dowels, cords and other means to control the sheathed cables (51) from transmission box (60).

FIG. 18 is a cross section through transmission box (60). FIG. 19 is a view from the top of the box, but with the top side (63) removed.

Referring to FIG. 18, a stiff piece dowel strap plate (74) runs from side to side of the transmission box (60). Toward the back of the transmission box (60), it helps to hold dowel strap (77) in position. It is bent upward toward the front. This bend helps the whole combination to return smoothly into its proper resting place after it has been pulled out by the pilot's leg pulling on power tackle line (95).

There is a flattened continuous loop dowel strap (77) of a 15/16 inch wide synthetic strap. One end is sewn around the dowel (78) and the effectuating sheathed cables (51) penetrate through eyelet protected holes made in the other end of dowel strap (77). The dowel strap (77) is about 1/16's inch thick. It is quite stiff and can stick straight out 1 inch without support even with the dowel (78) in its end loop. The strength of dowel strap (77) is much more than needed, but a less thick dowel strap (77) would not be stiff enough to hold the end with the dowel (78) straight out after the pilot's leg to cable (51a) temporary attachment means, C bracket (80), is moved on to another continuous loop dowel strap (77), cable (51a), and dowel (78) combination.

The stiff dowel strap (77) holds the dowel (78) and dowel strap (77) in spacial position, due to the tension from cables (51a) and the form of dowel strap plate (74) and lower back side (68), such that as the C bracket (80) is moved by C bracket rest (81) from dowel strap (77) to a different dowel strap (77) the C bracket (80) may slide over the dowel strap (77) and dowel (78). When the C bracket (80) engages the proper dowel strap (77) the power tackle line (95) pulls the C bracket (80) and dowel strap (77) forward. This causes cables (51a) at upper back side (67) to be pulled into the transmission box (60) thus actuating the desired operation on the paraglider. The selection of dowel straps (77) and cables (51a) are the gears in this type transmission box (60). Movement of the C bracket (80) between dowel straps (77) shifts the function performed or the gear.

The snap in door catch (73) mechanism holds the hinged front box door (70) piece in place when it snaps into the holding means door latch (72) at the front top of the transmission box (60).

The hinged front box door (70) closes the front of the transmission box (60) except for an opening just large enough for power tackle line (95) to pass through. The door system is intended to keep debris out of the transmission box (60) on launch. See below for further explanation of the purpose served by each of the box combinations.

The battery (97) is to power a circuitry means for circuitry (not shown) to signal (not shown), FIG. 15, visually to the pilot's eye, two feet above the transmission box (60). This signal will indicate which of the six possible box connections is temporarily attached to the leg connector means C bracket (80).

When the C bracket rest (81) arrives at a proper place for each new engagement with the combination, an electrical connection is made powered by battery (97) at the bottom of transmission box (60). The current provides a read out on a panel (not shown). The panel would be attached to the inside surface of the harness near main carabiner quicklink (110), FIG. 15.

A vertical stiff strip carriage panel (88) extends from side to side in the transmission box (60). And it extends from the bottom of the transmission box (60) up to the level of the C bracket rest (81). It is connected at its top with side to side strip carriage panel support (89). The carriage panel (88) also faces the carriage shafts (86) and it has a strip with indentations (93a) and position strip (93) for the carriage shaft (86). Such arrangement helps assure proper positioning of the traveling platform C bracket rest (81).

A very light precision carriage rack (90) with fine pitch is attached to each side of transmission box (60) upon which the spurred carriage shaft (86) rolls.

A door spring hinge (71) for the front box door (70) runs the length of the front of the transmission box (60). The front box door (70) is released from top door latch (72) by the leg connector C bracket (80) when the C bracket is pulled out of the transmission box (60).

Figure 20A:
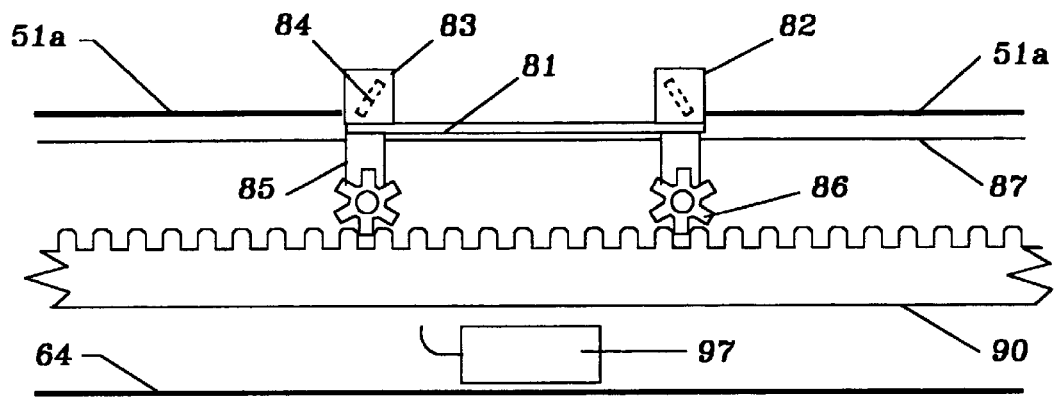
FIG. 20A illustrates a front view of the transporting platform for the leg connecting means of the function switching and expansion box
Figure 20C:
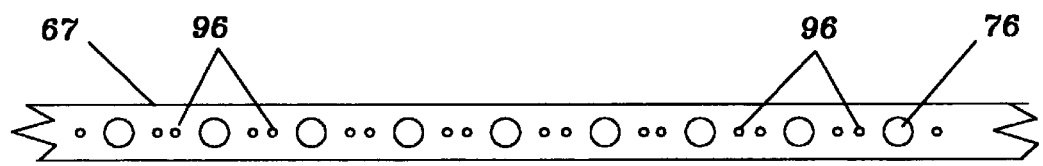
FIG. 20C illustrates a back view of the top one third of the back side of the function switching and expansion box.
Figure 20D:
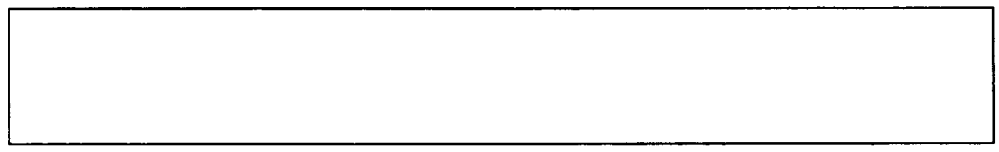
FIG. 20D illustrates a back view of the lower two thirds of the back side of the function switching and expansion box.
Figure 20E:
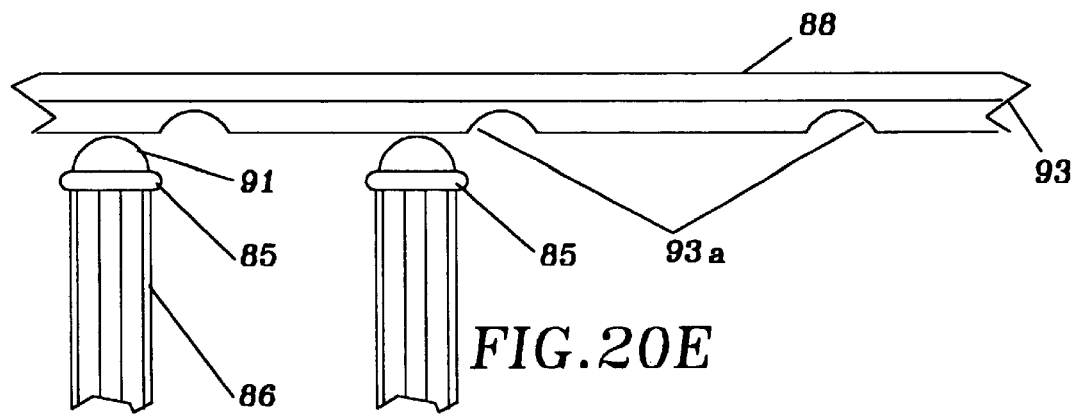
FIG. 20E illustrates a top view of the support legs of the transportation platform with details of the method to help the platform be lined up correctly.
Figure 20B:
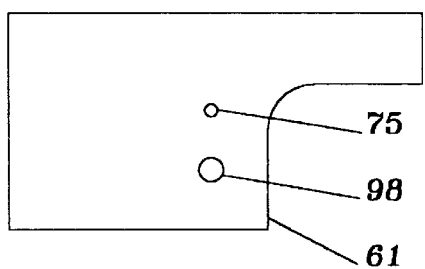
FIG. 20B illustrates a view of the right side panel of the function switching and expansion box.
Figure 20F:
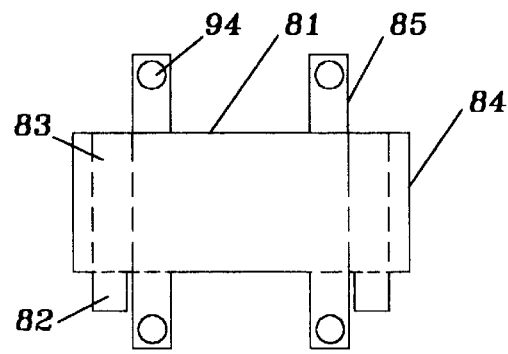
FIG. 20F illustrates the transportation platform shape before assembly where the dotted lines represent the bends to be made at assembly.

Referring to FIGS. 20A and 20F, a hollow spurred carriage shaft (86) is illustrated. The ends of the carriage shaft (86) pass through carriage shaft aperture (94) in carriage leg (85). The carriage shaft aperture (94) may also have a plastic bushing. An additional alignment device is provided inside the carriage shaft (86) as a spring (not shown) which pushes out at two position balls (91) at each end of the carriage shaft (86). The spurred carriage shaft (86) sits on the spurred carriage rack (90).

A stiff carriage panel support (89) extends to both sides of the transmission box (60) attached to the front of the bottom (64). It slants into the interior of the transmission box (60) and attaches at the top to the support carriage panel (88). It serves to guide each dowel strap (77) and dowel (78) connector back to the properly aligned resting position.

A stiff carriage transport panel (87) extends to and attaches to both sides of the transmission box (60). It serves only the function of assisting in keeping debris out of the lower parts of the transmission box (60). It runs between the downward extending carriage legs (85) of the traveling platform C bracket rest (81).

A traveling platform C bracket rest (81) is what the leg connector C bracket (80) sits in when the C bracket (80) is at rest. It is pulled from side to side by the exposed cable (51a) of a pull-pull cable system attached to each side of the platform C bracket rest (81). The inner wire exposed cable (51a) is the wire that is wound up by ratchet wind-up hand gear (52) on the hub handle bar (50) on each side of the pilot.

Platform rest (81) for C bracket (80) truly serves as a clutch and shift device. It connects and disconnects two parts and the platform repositions among at least three parts so that a new type of operation occurs.

The leg attacher C bracket (80) engages each dowel (78) and surrounding parts. The leg attacher C bracket (80) inside diameter is about ½ inch, the outside diameter is about 5/8 inch, the opening is about 3/16 inch and it's side to side length is 1 1/16 inch. For example, the Johnston Supply Company catalog, page 144, has an appropriate steel equivalent that it calls a shaft adaptor bushing with an open slot for keyway.

To ensure a snug hold within leg attacher C bracket (80) for dowel strap (77) the part of dowel strap (77) surrounding dowel (78) would have a 1/16 inch thick and 15/16 inch wide rough strip (58), such as hook and loop, glued on the outside of the dowel strap (77) around dowel (78) between dowel strap (77) and the inner surface of the leg attachment means C bracket (80).

A plastic dowel (78) about 1 inch long and about 3/16 inch in diameter is contained within the loop of the dowel strap (77).

FIG. 20B shows the left side (61) of the transmission box (60).

The bottom (64) panel of the transmission box (60) is seen in FIGS. 18 and 20A.

FIG. 20D shows the lower back side (68) making up a portion of the back side of the transmission box (60). Seen in FIG. 20, the superior most part of lower back side (68) is curved inward. It fits along the lower edge of the upper back side (67) of the back of transmission box (60).

The upper back side (67) of the rear of the transmission box (60) is seen in FIG. 20C. It is penetrated by back cable holes (76) with generic bushings (not shown) to reduce abrasion on cables (51a). The effector sheathed cables (51) to various attachments on the wing (100) pass from these back cables holes (76). Sheathed cables (51) pass from transmission box (60) perpendicularly, then directly up along the harness (112). Openings (96) in back panel (67) are to attach conduit stops (48) for the sheaths of sheathed cables (51).

In FIGS. 20A and 20F, a C bracket ridge (83), one of two C bracket ridges (83), of traveling platform C bracket rest (81) helps to position leg connecter C bracket (80) snugly and exert pressure on the side of connecter C bracket (80) so that it will allow dowel (78) to slip out as connecter C bracket (80) is moved along to cause the next covered dowel (78) to slip in. The C bracket lip (84) of means C bracket ridge (83) is bent outward to guide the entrance of the dowel strap (77) and leg connecter C bracket (80) connection to enter into its resting position against upper back side (67) and between the dowel separators (79). There is bound to be some vibration to move the assemblage off a perfectly straight path; therefore, another part the C bracket lip (84) is bent down in case the next dowel (78), with its covering, has drooped. Bend in C bracket lip (84) guides dowel (78) in loop of dowel strap (77) to get inside connecter C bracket (80).

FIG. 20F: Each carriage leg (85) is formed from a flap, one of four downward flaps, of metal. Each carriage leg (85) has a aperture (94) at the bottom through which the carriage shaft (86) passes.

FIG. 19: Dowel separators (79) ensure a snug hold on the dowel strap (77) and help to guide the dowel strap (77) back into its aligned resting position after it has made its excursion out.

FIG. 20E illustrates a position strip (93) is on carriage panel (88). This position strip (93) has indentations (93a) so the spring position ball (91) at the end of carriage shaft (86) will cause the carriage shaft (86) to line up at these indentations. The indentations will be so arranged that when the carriage shafts (86) come to rest in the indentations the traveling platform C bracket rest (81) will stop so as to align the leg connecter C bracket (80) precisely with the next one of six dowels (78).

FIG. 20B shows the edge of left side (61). Along this edge the lower back side (68) fits. The function of the curve is to assist the re-entrance into the resting place of the combination of C bracket (80) attached to dowel (78).

FIG. 19 shows the space (99) through which project the support carriage legs (85) of platform C bracket rest (81). FIG. 18 illustrates the space (99) is between the carriage panel (88) and the carriage transport panel (87) toward the front side (65) while space (99) toward the back side (66) of the transmission box (60) is between carriage transport panel (87) and the lower back side (68).

In FIG. 20B there is a larger hole side cable hole (75) in left side (61) for exposed cable (51a) to pass into transmission box (60). There is a smaller hole Carriage rack attachment hole (98) in sides (61) to affix carriage rack (90) to the sides of the transmission box (60).

FIG. 20F: There is a carriage leg passage aperture (94) in carriage leg (85) of traveling platform C bracket rest (81).

FIGS. 19, 20A and 20F show the bend in C bracket guide (82) in C bracket ridge (83) to help re-position box combination (80/78) after it has been pulled out and is reentering the transmission box (60). Also shown is the dowel (78) positioning bend C bracket lip (84) in C bracket ridge (83).

FIG. 19 is a top view looking down at the transmission box (60) with the top (63) off. The alignment of the functions for each of the five dowels (78) is from left to right is:

1. to affect the A riser (107a) Big Ears producing parts;
2. to affect the trim or speed system. If attached to the trim system, then a 6 inch elastic means will also be attached to the quicklink (24) that attaches the effectuating sheathed cable (51) to the trim tab strap (145), such as suggested in FIG. 6. The elastic means will be so positioned so that after the pilot's leg has pulled down trim tab straps (145) the elastic means will pull up the sheathed cable (51) so as to bring the bracket/dowel combination (80/78) back into its resting position in the transmission box (60).
3. to affect the right brake loop (120). One of the back cable holes (76) is used for an 8 inch rubber band to pull the dowel strap (77) back into transmission box (60) after the pilot's leg has pulled it out with the connecter C bracket (80).
4. to affect the left brake loop (120). One of the back cable holes (76) is used for an 8 inch rubber band, also not shown, to pull the dowel strap (77) back in to the transmission box (60).
5. to affect the B riser (107b). For the B Riser system stall function.

Obviously under the seat board (115) there is enough room to put in more positions for any of a variety of other functions. For example, to pull on C risers one can devise a permanent attachment to the leg power means or to put in an idler position for use on running take off, etc.

The leg connecter C bracket (80) engages any of the dowels (78) combinations by proper positioning. Each dowel (78) combination includes attachment to a cable (51a) that will go to affect some part of the suspensory parts of the paraglider wing suspension lines (106) and/or risers (107a–d).

Control of the traveling platform C bracket rest (81) is done by a cord means passing out of each side of transmission box (60) at side cable hole (75). The cord passes through two pulleys (36) and is attached to a platform handle (38) for the hand to operate, as seen FIG. 14. The throat of platform handle (38) is partially enclosed by a horizontal supporting round channel (39).

Figure 14:
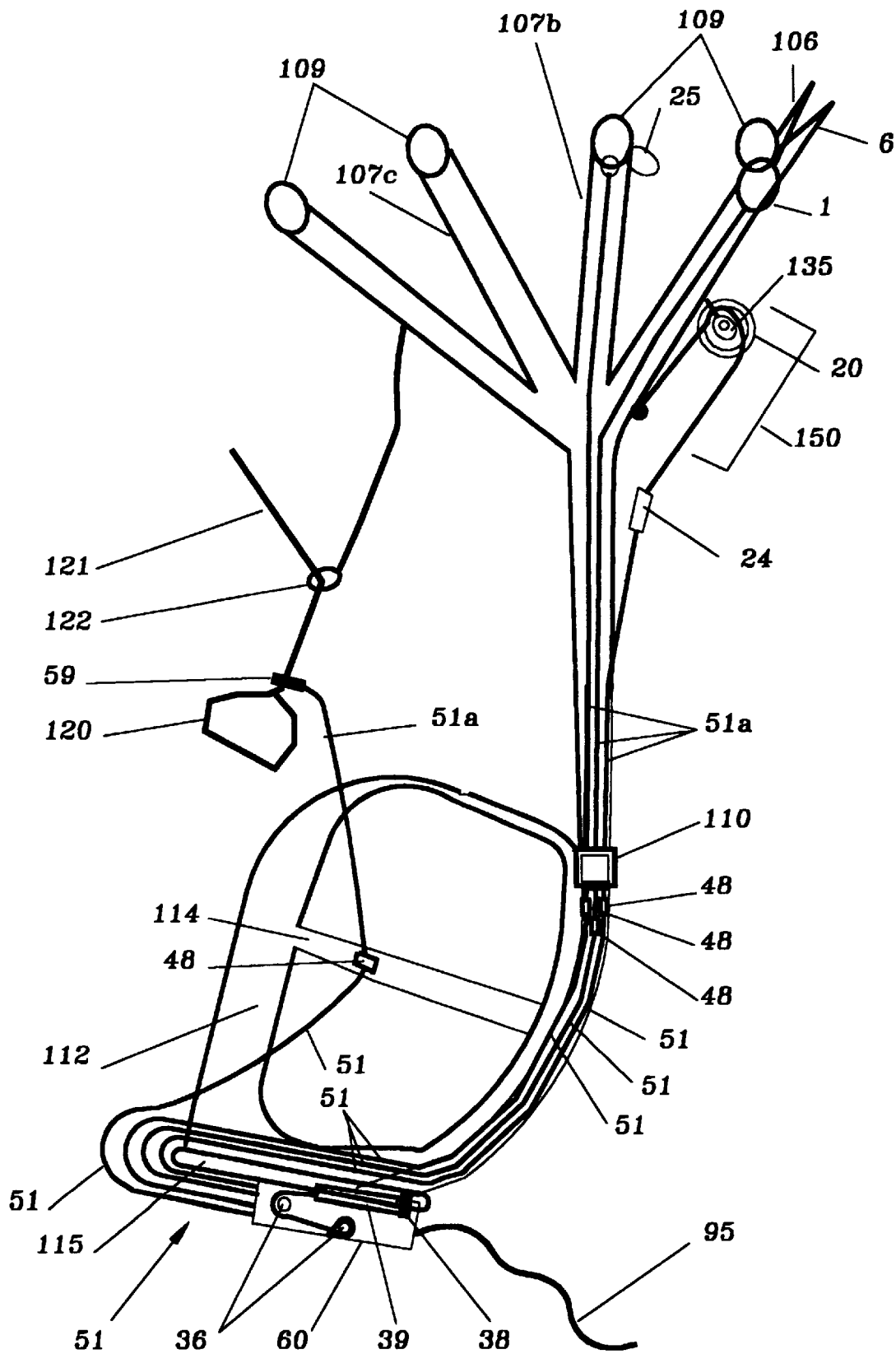
FIG. 14 illustrates a right side view emphasizing the effectuating cable system running from the function switching and expansion box to the wing suspension parts when a speed stirrup system is used.

When the hand rachet wind up gear (52) is used to move platform C bracket rest (171) the cables (51) to the transmission box (60) have the conduits terminate with attachment on the sides of the transmission box (60). Then the inner wire core (51a) proceeds inside transmission box (60) and terminates on either side of the traveling platform C bracket rest (81). Effectuating Cables from the transmission box to the Wing:

Basically as illustrated in FIG. 14, the effectuating cables/lines from the transmission box (60) are as follows.

Although a wire (51a) inside the conduit of a cable needs to have the breaking strength of 400 pounds for pulling on the speed system (150) or trim tab systems (149), inner wires to other parts of the wing (100) can be much less strong.

One end of all the effectuator conduit sheathes will stop (48) right over the exit back cable holes (76) on the transmission box (60). All of the wire/conduit combinations of sheathed cables (51) will proceed directly to the rear of the harness (112). From there these will be guided by loops around and up to keep them out of the way in the most convenient way for the particular construction of each harness (112). The details are obvious to any skilled manufacturer. The other ends of the conduits will all stop (48) on the medial or lateral surface of the main vertical harness strap (113) just below the main carabiners quicklink (110).

All inner wire cores proceed upward to final effectuating points. These cables all end in a loop type of end. The loops will go around a generic carabiner quicklink (24); thus, the harness can be readily separated from the wing, if wished.

The preferred embodiment utilizes sheathed cables (51) as the simplest method to protect cables routed between attachment points. Of course, exposed cords using pulleys, loops and carabiners may also be used instead of pull-pull type cables.

FIG. 14 is a view looking at the right side. It deals mainly with the group of sheathed cable (51) proceeding from the back of the transmission box (60) routed to appropriate attachment points.

In the fullest use of the elements of the invention, on each side, the passage of cable systems to and from the transmission box (60) are as follows. There is one cable (51) from the hand hub handle bar (50) to affect the transmission box (60). From the transmission box (60) four pull-pull sheathed cables (51) to affect some aspect of the wing, specifically, the trim tab, wing tip, B riser cables, and brake loop cable systems. The left side also has a total of five.

The cable (51a) to the brake loop (120) ends in a loop and quicklink as all the cables do. Quicklink (59) goes around the brake line (121) at a point between the brake loop (120) and the brake loop limiter (122). The brake loop cables (51a) provide for pulling the brake loop (120) and thereby the brake lines (121) into a particular position.

Each of the other effectuating cables (51a) are routed to appropriate attachment points.

The cable (51a) for producing wing tips collapse is attached to an A riser trim line quicklink (7).

One cable (51a) is attached to the B riser (107b) carabiner quicklink (109).

The transmission box (60) is so constructed that when the power tackle line (95) is loose the power tackle line (95) is wound back inside by the pull of the wing (100). In most cases this is accomplished by the addition of a rubber band of about 8 inches length. One end of the rubber band is attached to each dowel strap (77) or effectuating cable (51a). The other end is attached to the harness (112) or risers (107a–d). These rubber bands help assure that the leg connector C bracket (80) is completely pulled back into position for connecting with a different dowel (78).

The construction of the transmission box (60) provides for smoothly and very simply engaging the connection C bracket (80), attached to the power tackle line (95), onto various effector dowels (78) without worry or significant input required of the pilot.

ADD ON IV

Manual Machines, other than the brake loop, that cause another paraglider part to do something desired.

To provide contrast with current art FIG. 2, FIGS. 4 through 17 show most of the elements of the present invention: the basic system through Add On IV.

FIGS. 12, 13, 15, 16, for example, show the hub handle bar (50) comprises a hand operated assemblage that is able to make a desirable change in parts of the paraglider. It comprises a combination of hub handle bar tubes (47) plus material means (51–55) that transmit measurable forces to effect desirable changes in distant paraglider parts, in addition to the brake loop (120), and does so without moving the hands from the brake loop (120).

Figure 16:
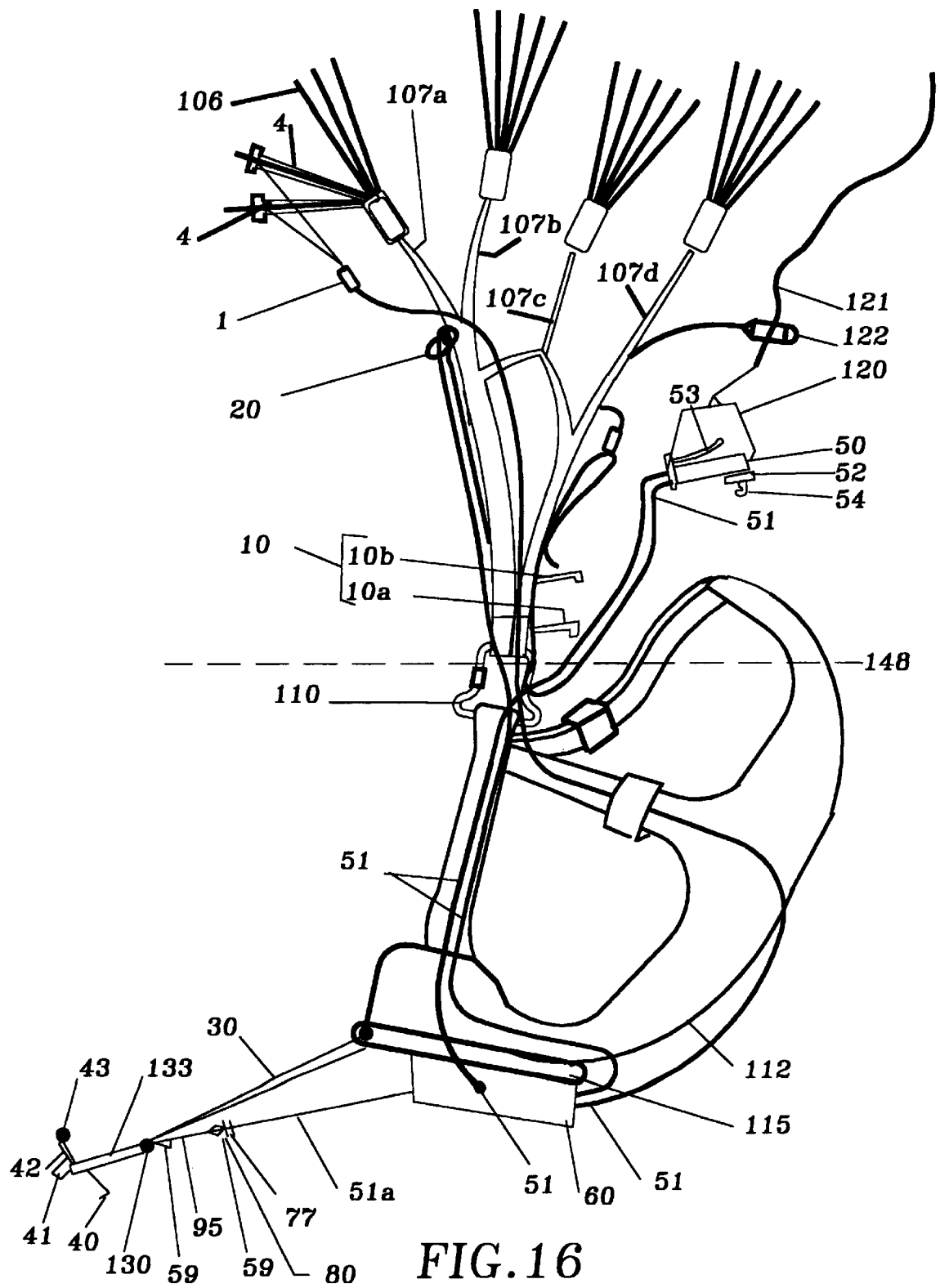
FIG. 16 illustrates a left side view of the paraglider with the features of FIG. 15 with some elements simplified.

FIGS. 16, 15 and 11 in the preferred embodiment illustrate the Add On IV part of the paraglider flight control system which includes a manual cable control lever type set up for each hand. The hub handle bar (50) is suspended from the risers (107a–d) independently of the brake loop (120), but when the pilot chooses to use it, the pilot grasps the hub handle bar (50) and holds it along with the brake loop (120).

Figure 12A:
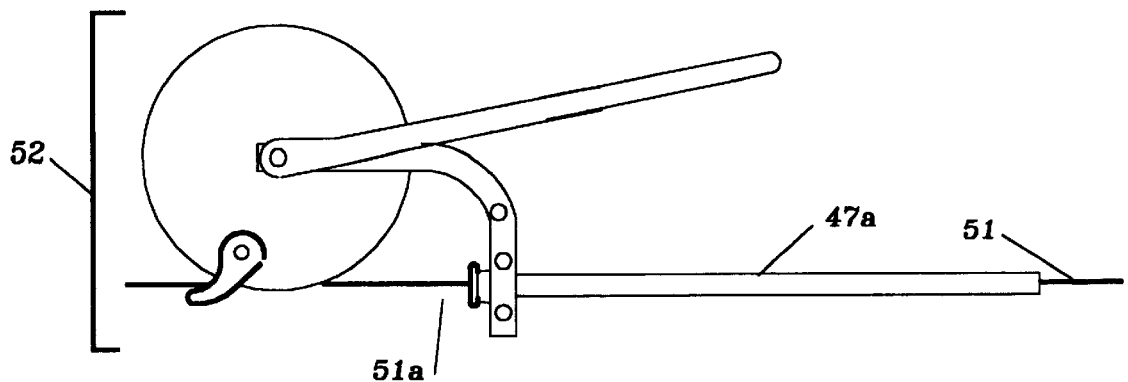
FIG. 12 illustrates three separated gear/leavers and material support components that would make up most of the master control hub.
Figure 12B:
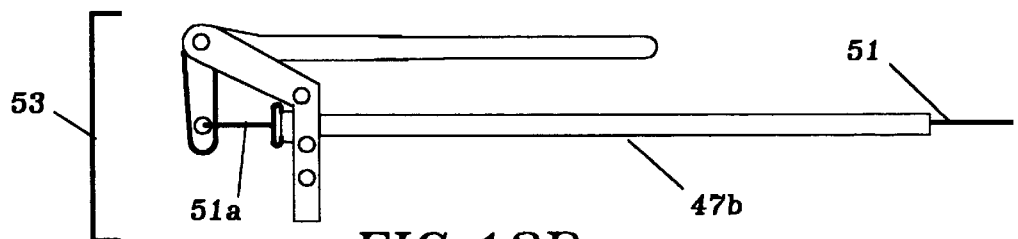
Figure 12C:
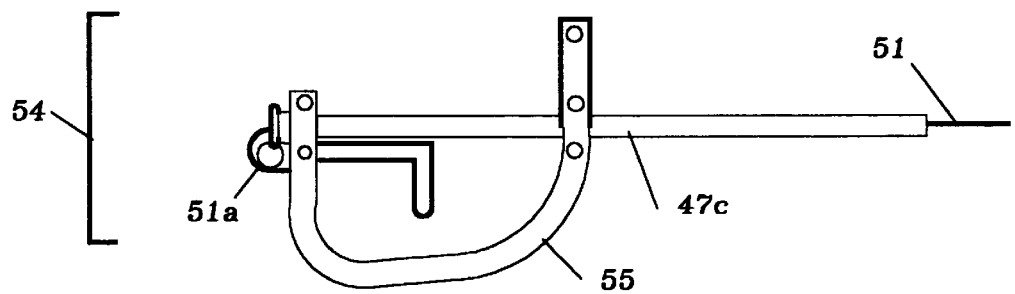

In FIG. 12 the mechanical means that transmit measurable forces to effect desirable changes in distant paraglider parts are levers and gears (52,53,54).

In an alternative configuration, the mechanical means could be a button on an electrical panel staging platform, etc. The pushed button would lead to radio waves being transmitted to a receiver and motors at a distant part, etc.

The connection between the hand lever set up, other paraglider parts and the risers (107) may be a direct connection by use of cables (51) to points on the paraglider. On the other hand, Add On III involves the use of a transmission box (60) intermediate the hand lever set up and the paraglider parts. The hand lever set up allows for many adjustments in the paraglider wing surface shape, while the brake loops (120) are able to be kept at the best and safest position other than as in current art or in above mentioned configurations of the instant invention.

In FIG. 11, Add-On IV embodiment involves no transmission box (60). All the cables (51) from the gear/levers of hub handle bar (50) go to the suspensory parts of the wing (100). One ratchet wind up gear (52) per side wind up the cable (51a) to cause Big Ears. Thus, exposed cable (51a) of ratchet wind up gear (52) is attached to A riser ring (7). The speed stirrup cord (131) attaches to the speed system (150) or trim tab system (149), whichever the particular paraglider has.

Figure 17:
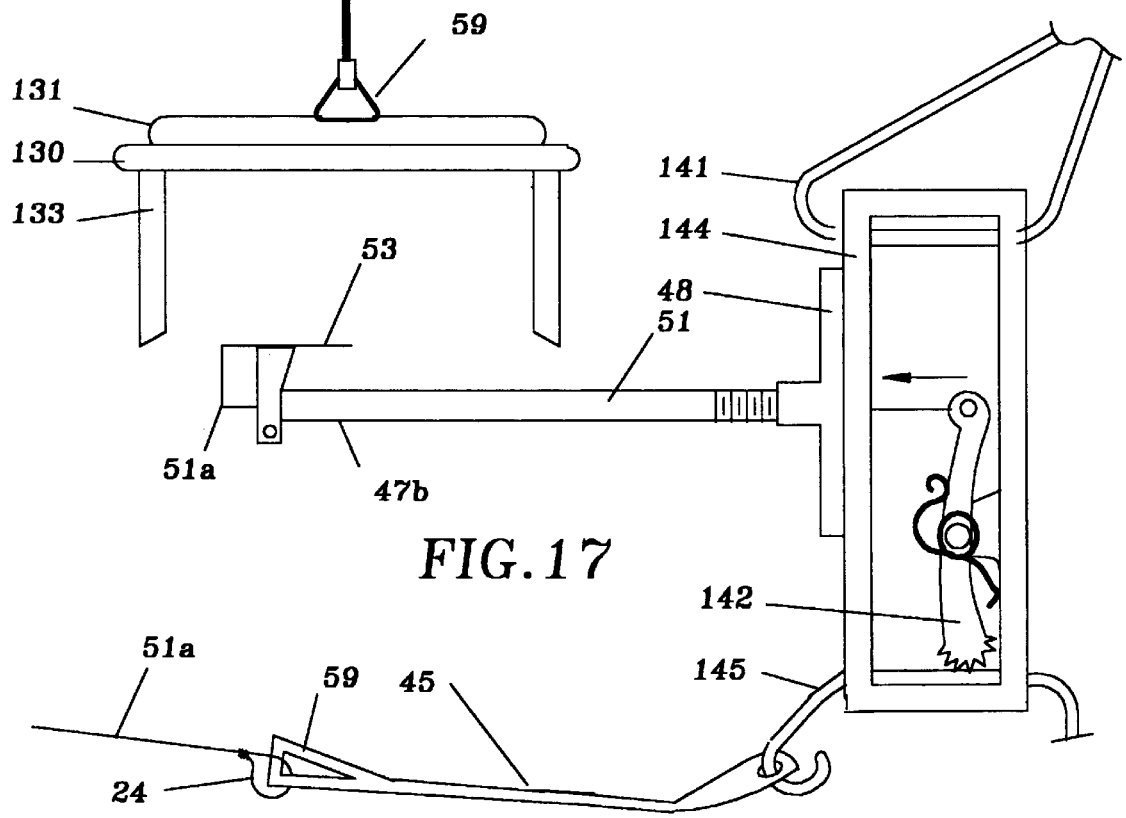
FIG. 17 illustrates a view of the trim tab buckle with attached invention parts to affect the buckle.

FIG. 17: if the paraglider has the trim tab system (149), a squeeze lever (53) on each of the hub handle bars (50) will go to the trim tab jaw clamp (142). The pull trigger (54) gear type has its exposed cable (51a) go to release the rocket of the reserve parachute (118).

In Cases with the Transmission Box.

The other version of the hand lever/gears are used when one has adopted ADD-ON III. In this configuration, a cable hand control hub (50) is also held in addition to the related art brake loop (120).

The hand control mechanism (50) is connected via cables (51) to a transmission box (60) located under the seat board (115). The length of cable needed from the bottom of the transmission box (60) to the point of brake loop limiter (122) is about 55 inches.

Referring to FIGS. 12, 5, and 15: the inventions's hand control mechanism (50) for each of the pilots hands has two finger levers. One type of ratchet wind up gear (52) controls movement of the power tackle C bracket (80) in transmission box (60) in the opposite direction of the ratchet wind up gear (52) in the other hand.

The squeeze lever (53) in each hand opens the trim tab spring jaw clamp (142) on each side. This type of spring jawed cam buckle (144) is commonly purchasable and does not need a breaking strength greater than 500 pounds. Like cables used for shifting gears of multiple speed bicycles, pull-pull sheathed cables (51) connect the hand gears with other parts.

The hand control mechanism (50) for the thumb of the right hand of the pilot has a pull trigger (54) to release the emergency parachute (118). It has a protective ring safety guard (55) to help prevent pull trigger (54) from being squeezed accidentally.

FIGS. 12 and 5 illustrate the three parts of the hand control mechanism (50). Thus, the brake loop (120) remains. In addition there is now a firm staging platform, the hub handle bar (50).

Figure 13:
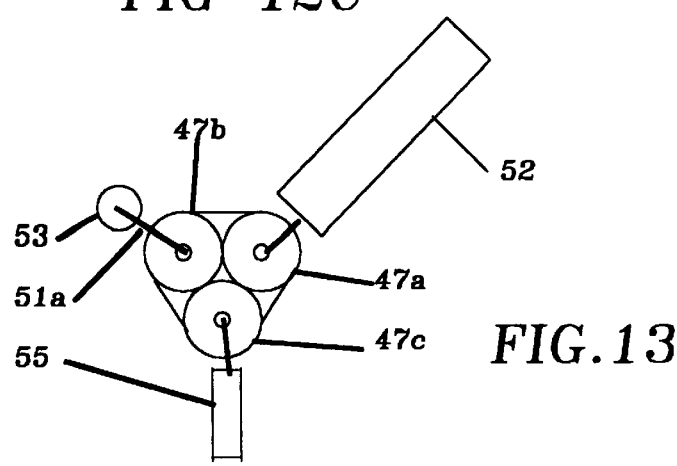
FIG. 13 illustrates a cross section of the hub handle bar.

FIG. 13, hub handle bar (50) is actually composed of the three separate handle tubes (47) for the pull-pull cable of each gear to pass through. At one end they are bound together by the attachment means of each gear. At the other end, hub handle bar (50) is held together by the hub handle bar's (50) snap in means (56). Snap in means (56) surrounds the tubes, and it has a snap in to snap into its mating snap on the Riser. Referring to FIGS. 12, 13, there should be allowance for approximately 5 inches for each hand to grip on the tubes (47), and on which there are a maximum of three pull-pull or other control means that will transmit action by the fingers for remote actuation. The pull-pull sheathed cables (51) pass from the medial side of the handle tube (47) to the lateral side which helps to keep the sheathed cables (51) out of the way of the pilot.

Of course, if the paraglider has the speed system (150) there would be no squeeze lever (53) per side that goes to a trim tab system buckle (144). Hence hub (50) on the left has only gear (52) and on the right has the pull trigger (54) gear to the rocket pack on parachute (118) and ratchet wind up gear (52).

Hub handle bar (50) is hung from the top of the D riser (107d) by an elastic strap (49) at the end of the hub handle bar (50) where the gears are located.

FIG. 5, about 7 inches after the sheathed cables (51) have passed out of the handle tubes (47) they should be attached to a downward pointing lightweight semicircular means (44) of about 2½ inches. This in turn will be suspended by an elastic strap (49), of about 10 inches, from carabiner quicklink (109) of the medial side of the B riser (107b). This also helps the sheathed cables (51) to be less kinked and stay out of the way, especially during reverse launches.

FIG. 5, the non-gear lateral end of the hub handle bar (50) has a snap in buttons means (56) to snap it onto the lateral side of the C riser (107c). When it is snapped into position here at launch, the combination of the two rubber suspensions elastic straps (49) and the snap means (56) put the hub handle bar (50) into an essentially vertical position to keep it as much out of the way on launch as possible while keeping it positioned to grab along with the brake loop (120) in the pilot's hands.

Suggestions for the individual lever and gear mechanisms (52,53,54) for Add-On IV, when used with Add-on III, are illustrated in FIG. 12. None of the levers requires heavy strength material because the load each would pull would be 4 pounds maximum. There is no shock/peak load safety factor needed here.

The squeeze lever (53) will need to exert about 3 pounds of pressure and shorten the cable (51a) to trim tab jaw clamp (142) about ¼ inch.

See FIG. 17 is a cross section through the trim tab cam buckle (144). The cable (51a) to release the trim tab jaw clamp (142) in its sheath proceeds to screw into a conduct stop (48) attached to the back of the pinch jaw clamp (144) on the D riser (107d). The inner cable proceeds to a hook like ending which will attach to the lever that will keep open the jaw (142) as long as the lever action gear (53) on the hub handle bar is squeezed. To attach a cable (51a) to the jaw (142), a manufacturer has to change the current position of the trim tab jaw buckle (144). Thus, one turns the buckle (144) over so the lever to operate the spring jaw now faces the riser. A conduit stop (48) is attached to buckle (144) on the opposite side of buckle (144) farthermost from the control lever of the jaw (142).

All gears should be as compact as possible and the construction of these is obvious to any maker of simple gears after being informed what functions the gear is to perform.

The ratchet wind up gear (52) will be about 1¼ inches in circumference. It has to be able to take up 8 inches of inner wire. Each squeeze of the lever of this ratchet wind up gear (52) will advance the cable ¾ inch and hold it pulled in. The ratchet wind up gear (52) re-cocks the lever automatically after the pilot has squeezed it completely. Two squeezes will carry the power linkage gear C bracket (80) in the transmission box (60) into position for the next function gear. A means added on this ratchet wind up gear (52) allows disengagement, thereby allowing the cable of this ratchet wind up gear (52) to unwind.

The construction of ratchet wind up gear (52) will have to be heavier if it is used in that embodiment with Add On III in FIGS. 12 and 16 in which this type of ratchet wind up gear (52) is used to pull down A riser ring (7) for Big Ears.

All the following described pull-pull cables have the inner wire of the 7×19 type for maximum kink resistance and of diameter about 0.01–0.09 inch. This wire core is surrounded by a maximally flexible outer conduit sheath of appropriately minimum diameter.

Of course, each conduit sheath is terminated with a non-moving mount, the conduit stop (48), which allows the actuating inner wire to continue to its attachment to the point where actuation is actually desired in each case.

The sheathed cables (51) are routed from the hand control mechanism (50) levers to the transmission box (60) or other location such as the emergency parachute (118) by the most direct means which does not interfere with the pilot. As the sheathed cables (51) are sheathed, they may be routed through the main carabiner quicklink (110) or along the main carabiner riser (108a) down the vertical harness strap (113) and under the seat board (115) to the transmission box (60). Any sheathed cable (51) could also be routed along other straps, through carabiners and around the back of the seat harness (112) as is illustrated in FIG. 11 for the emergency parachute (118) sheathed cable (51). The sheathed cables (51) may be held in place by any variety of cable loop retainers, carabiner quicklinks, or cable clamps. The exact path is not important, but these will vary according to different types of paragliders. The only limitation on the pull-pull cable/conduits is that sharp angles should be minimized, since that reduces efficiency, but they can be curved smoothly in 360 degree turns, etc.

ALTERNATE VERSION OF THE TRANSMISSION BOX

Figure 23:
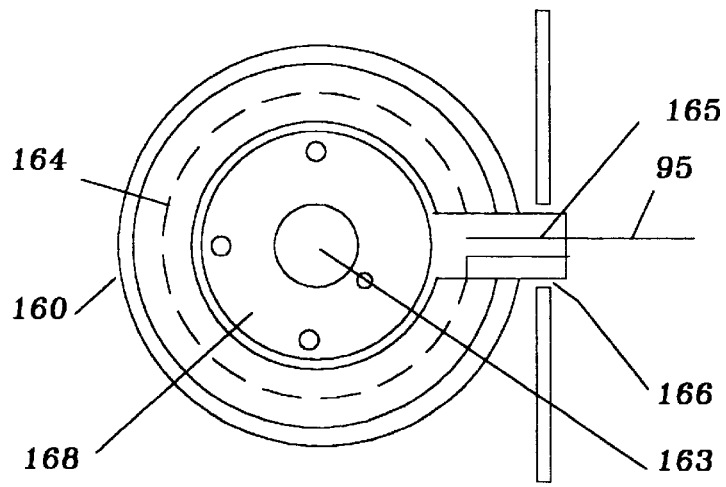
FIG. 23 illustrates a side view of the spooling device.

Of course, many alternate version of a transmission box (60) are possible. One is illustrated in FIGS. 21, 22, 23. In this embodiment, the movement of the cables is caused by the rotation of circular gears and shifting to power any particular gear is accomplished by movement of a leg power linkage gear (162) to each of a plurality of leg power drive gears (160). The transmission box (60) has a drive gear shaft (161) mounted therein between a left side (61) and a right side (62). The drive gear shaft (161) has a plurality of leg power drive gears (160) rotatably mounted thereon at fixed locations on the drive gear shaft (161). Each of the leg power drive gears (160) has an exposed cable (51a) attached such that when the gear is rotated the cable is wound on the gear. The attached cables exit the transmission box (60) through back cable holes (167) formed in the back side(66) of the transmission box (60) from where they may be routed to the appropriate paraglider function to be controlled as discussed in the previous presentation concerning routing of the control cables (51).

The transmission box (60) also has a leg gear shaft (163) mounted between the left side (61) and the right side (62)

cooperatively located such that a leg power linkage gear (162) rotatably mounted thereon may be shift between and engaged with each of the leg power drive gears (160). The leg power linkage gear (162) is use to power the rotation of the leg power drive gears (160). The leg power linkage gear (162) has a spool device (164) rigidly attached. The spool device (164) has a power tackle line (95) attached which power tackle line (95) passes through a cord guide bracket (165) and then through the front side (65) by means of a transmission box slot (166). The power tackle line (95) may be connected to the speed stirrup (130) as discussed in prior applications of the speed stirrup (130) implementation. Thus when the power tackle line (95) is pulled by the pilot's foot, the spool device (164) and the leg power linkage gear (162) are caused to rotate. This rotation in turn will rotate the leg power drive gear (160) to which the leg power linkage gear (162) is cooperatively engaged.

The leg power linkage gear (162) is slidably mounted on the leg gear shaft (163). A sheathed cable (51) is attached to each side of the leg power linkage gear (162) and the cables exit the transmission box (60) at the left side (61) and right side (62) from which point the may be routed and controlled in on of the several methods discussed previously for control and shifting of the transmission box (60). The transmission box (60) may have a location position means to monitor the position of the leg power linkage gear (162) on the leg gear shaft (163) which may be either electrical or mechanical. Such methods where presented previously in the disclosure. The gears may also incorporate ratchet type mechanisms to prevent rotation of the gears in one direction until such time as the ratchet is released. This would be useful to retain a particular cable at a desired length.

I claim:

1. An apparatus for control of a lightweight pilot carrying aircraft by adjustments to a plurality of brake lines attached to an aircraft wing comprising a wing suspension retainer in an exposed L shape having an adhesion material which wing suspension retainer is attached adjacent to a main carabiner quicklink at a brake loop non stall position of the aircraft and a brake loop having a compatible adhesion material.

2. The apparatus as in claim 1 wherein the adhesion material is hook and loop.

3. An apparatus for control of a lightweight pilot carrying aircraft by adjustments to a plurality of wing suspension lines attached to an aircraft wing and a pilot seat harness by a plurality of support risers and straps comprising a means to attach a wing suspension line, a carabiner quicklink, a speed system, a trim tab system, a parachute and a brake loop to a transmission box having a means to connect to a speed stirrup.

4. The apparatus as in claim 3 wherein the transmission box is comprised of:
   a) a left side, a right side, a top, a bottom, a lower back side, an upper back side and a back side panel;
   b) a box door is attached to the bottom by a door spring hinge with a door latch attached to the top and a door catch attached to the edge of the bottom opposite the door spring hinge;
   c) the upper back side having a plurality of back cable holes formed therein through which a cable may pass;
   d) the cable attached to a dowel strap which dowel strap has a dowel mounted therein;
   e) the dowel and the dowel strap are retained between a pair of dowel separators;
   f) a C bracket which fits over the dowel and the dowel strap and rests on a C bracket rest;
   g) the C bracket rest having a C bracket guide and a C bracket ridge with a C bracket lip;
   h) the C bracket rest having a plurality of carriage legs which carriage legs have a carriage shaft aperture defined therein through which a carriage shaft is mounted;
   i) a C bracket transport panel mounted between the left side and the right side and between the lower back side and a carriage support panel mounted perpendicular to the bottom and parallel to the lower back side with a C bracket transport panel attached;
   j) the C bracket rest mounted on a carriage rack with a means to move the carriage rest with the carriage shafts resting on a carriage rack mounted below the C bracket rest;
   k) the carriage rack having a plurality of protrusion with which the carriage shaft protrusions cooperatively engage as the carriage shaft is rotated on the carriage rack;
   l) the carriage shaft having a position ball at each end which has a position spring wherein the position ball is cooperatively located relative to a position strip mounted on the lower back side and on the carriage support panel so the position ball may seat in the position strip apertures therein; and
   m) the C bracket attached to a power tackle line.

5. The apparatus as in claim 4 wherein the power tackle line is attached to a speed stirrup and the speed stirrup having a means for engagement by a pilots foot.

6. The apparatus as in claim 4 wherein the means to control the movement of the C bracket rest is a manual gear and lever system handle bar means for controlling paraglider parts and the handle bar means is attached to the C bracket rest by a means for attachment.

7. The apparatus as in claim 4 wherein the means to control the movement of the C bracket rest is a manual handle adjacent to the transmission box and the manual handle connected to the C bracket rest by a means for connection.

8. The apparatus as in claim 3 wherein the transmission box is comprised of:
   a) a left side, a right side, a top, a bottom, a back side and a front side;
   b) the back side having a plurality of back cable holes formed therein through which a sheathed cable may pass;
   c) the sheathed cable attached to a leg power drive gear which is rotatably mounted on a drive gear shaft mounted between the left side and the right side;
   d) a leg power linkage gear rotatably and slidably mounted on a leg gear shaft and attached to a spool device rotatably and slidably mounted on the leg gear shaft such that the leg power linkage gear teeth may cooperatively engage the leg power drive gear teeth;
   e) a means to move the leg power linkage gear and the spool device longitudinally on the leg gear shaft;
   f) a means to determine the position of the leg power linkage gear; and
   g) the spooling device having a power tackle line attached which power tackle line passes through a cord guide bracket which cord guide bracket is guided in the front side by a transmission box slot defined therein.

9. The apparatus as in claim 8 wherein the power tackle line is attached to a speed stirrup which speed stirrup and the speed stirrup having a means for engagement by a pilot's foot.

10. An apparatus for control of a lightweight pilot carrying aircraft by adjustments to a plurality of wing suspension lines attached to an aircraft wing and a pilot seat harness by a plurality of support risers and straps comprising an A riser ring placed around two forward A riser suspension lines which A riser ring has an A riser ring hook attached which A riser hook has an adhesion material and a main carabiner quicklink having a compatible adhesion material.

11. The apparatus as in claim 10 wherein the adhesion material is hook and loop.

12. An apparatus for control of lightweight pilot carrying aircraft by adjustment to a plurality of wing suspension lines attached to an aircraft wing and a pilot seat harness by a plurality of support risers and straps comprising an A riser ring placed around two forward A riser suspension lines which A riser ring has an adhesion material, and a wing stabilizer retainer having a compatible adhesion material and attached adjacent to a main carabiner quicklink.

13. The apparatus as in claim 12 wherein the adhesion material is hook and loop.

14. An apparatus for control of a lightweight pilot carrying aircraft by adjustments to a plurality of wing suspension lines attached to an aircraft wing and a pilot seat harness by a plurality of support risers and straps comprising:
  a) an A riser supplemental quicklink;
  b) an A riser tube through which passes a forward A riser suspension line;
  c) an A riser trim line attached to the A riser suspension line near where the A riser suspension line exits the A riser tube and the A riser trim line attached to an A riser supplemental quicklink; and
  d) an A riser elastic strap attached to the A riser supplemental quicklink and attached to an A riser.

15. An apparatus for control of a lightweight pilot carrying aircraft by adjustments to a plurality of wing suspension lines attached to an aircraft wing and a pilot seat harness by a plurality of support risers and straps comprising:
  a) an A riser supplemental quicklink;
  b) a means to connect the A riser supplemental quicklink to the wing suspension lines; and
  c) the A riser supplemental quicklink has an A riser speed stirrup cord attached and the A riser speed stirrup cord passing through a speed stirrup cord loop attached to a seat board wherein the A riser speed stirrup cord attached to a speed stirrup.

16. The apparatus as in claim 15 wherein cord stirrup tube has attached a speed stirrup retainer cord.

17. The apparatus as in claim 15 wherein the speed stirrup has a speed stirrup cord tube attached.

18. The apparatus as in claim 15 wherein: the A riser trim line strap passes through a stirrup augmentation system guide ring and a stirrup augmentation system stop ring with the A riser trim line strap having a stirrup augmentation system hook on an end; and a stirrup augmentation system ring attached to a speed stirrup cord which speed stirrup cord passes through a speed stirrup cord loop attached to a seat board and the speed stirrup cord attached to a speed stirrup.

19. The apparatus as in claim 18 wherein the stirrup augmentation system hook is attached to the A riser trim line strap by placing a strap eyelet therein through which the stirrup augmentation system hook protrudes and closing the A riser trim line strap around the stirrup augmentation system hook with a means to close.

20. The apparatus as in claim 15 wherein the speed stirrup has a speed stirrup foot cord attached.

21. The apparatus as in claim 15 wherein the means for further acting is a trim line strap buckle attached adjacent to a main carabiner quicklink.

22. An apparatus for control of a lightweight pilot carrying aircraft by adjustments to a plurality of wing suspension lines attached to an aircraft wing and a pilot seat harness by a plurality of support risers and straps comprising;
  a) an A riser supplemental quicklink;
  b) a means to connect the A riser supplemental quicklink to the wing suspension lines; and
  c) a wing stabilizer retainer to retain the A riser supplemental quicklink attached adjacent to a main carabiner quicklink having a compatible adhesion material with the A riser supplemental quicklink having an adhesion material.

23. The apparatus as in claim 22 wherein the adhesion material is hook and loop.

24. An apparatus for control of a lightweight pilot carrying aircraft by adjustment to a plurality of wing suspension lines attached to an aircraft wing and a pilot seat harness by a plurality of support risers and straps comprising:
  a) an A riser means to pull and retain connected to the wing suspension lines and a means to attach the A riser means to pull and retain to a riser complex; and
  b) the A riser means to pull and retain has an adhesion material which is hook and loop.

25. An apparatus for control of a lightweight pilot carrying aircraft by adjustments to a plurality of wing suspension lines attached to an aircraft wing and a pilot seat harness by a plurality of support risers and straps comprising:
  a) an A riser means to pull and retain connected to the wing suspension lines and a means to attach the A riser means to pull and retain to a riser complex; and
  b) an A riser strap attached adjacent to the A riser means to pull and retain which A riser strap passes through an A riser strap buckle.

26. An apparatus for control of a lightweight pilot carrying aircraft by adjustments to a plurality of wing suspension lines attached to an aircraft wing and a pilot seat harness by a plurality of support risers and straps comprising:
  a) an A riser means to pull and retain connected to the wing suspension lines and a means to attach the A riser means to pull and retain to a riser complex; and
  b) an A riser hook with a compatible adhesion material and a main carabiner quicklink having a compatible adhesion material.

27. An apparatus for control of a lightweight pilot carrying aircraft by adjustments to a plurality of wing suspension lines attached to an aircraft wing and a pilot seat harness by a plurality of support risers and straps comprising:
  a hook with adhesion material and a main carabiner quicklink having a compatible adhesion material.

28. An apparatus for control of a lightweight pilot carrying aircraft by adjustments to a plurality of wing suspension lines attached to an aircraft wing and a pilot seat harness by a plurality of support risers and straps comprising:
  a) an A riser means to pull and retain connected to the wing suspension lines and a means to attach the A riser means to pull and retain to a riser complex; and
  b) an A riser intermediate quicklink with an adhesion material and the means to attach is a wing stabilizer retainer having a compatible adhesion material which is attached adjacent to the main carabiner.

29. An apparatus for control of a lightweight pilot carrying aircraft by adjustments to a plurality of wing suspension lines attached to an aircraft wing and a pilot seat harness by a plurality of support risers and straps comprising:
  a) an A riser tube around a forward A riser suspension line;

b) an A riser trim line passing through the A riser tube and attached to a carabiner quicklink and the A riser trim line on an opposite end attached to an A riser trim line quicklink; and c) an A riser elastic strap attached to the A riser trim line quicklink and attached to an A riser.

30. An apparatus for control of a lightweight pilot carrying aircraft by adjustments to a plurality of wing suspension lines attached to an aircraft wing and a pilot seat harness by a plurality of support risers and straps comprising:

a) a speed system means to retain attached to a lower riser harness complex which speed system means to retain has an adhesion material and a means to attach the speed system means to retain adjacent to a main carabiner quicklink; and b) hook and loop adhesion material.

31. An apparatus for control of a lightweight pilot carrying aircraft by adjustments to a plurality of wing suspension lines attached to an aircraft wing and a pilot seat harness by a plurality of support risers and straps comprising:

a) a speed system means to retain attached to a lower riser harness complex which speed system means to retain has an adhesion material and a means to attach the speed system means to retain adjacent to a main carabiner quicklink; and b) a speed system strap attached adjacent to the speed system means to retain which speed system strap passes through a speed system strap buckle attached adjacent to a main carabiner quicklink.

32. An apparatus for control of a lightweight pilot carrying aircraft by adjustments to a plurality of wing suspension lines attached to an aircraft wing and a pilot seat harness by a plurality of support risers and straps comprising:

a) a speed system means to retain attached to a lower riser harness complex which speed system means to retain has an adhesion material and a means to attach the speed system means to retain adjacent to a main carabiner quicklink; and b) a speed system hook with adhesion material and a main carabiner quicklink having a compatible adhesion material.

33. An apparatus for control of a lightweight pilot carrying aircraft by adjustments to a plurality of wing suspension lines attached to an aircraft wing and a pilot seat harness by a plurality of support risers and straps comprising:

a) a speed system means to retain attached to a lower riser harness complex which speed system means to retain has an adhesion material and a means to attach the speed system hook means to retain adjacent to a main carabiner quicklink having a compatible adhesion material; and b) a speed system hook with adhesion material and a wing stabilizer retainer having a compatible adhesion material and attached adjacent to the main carabiner quicklink.

34. An apparatus for control of a lightweight pilot carrying aircraft by adjustments to a plurality of wing suspension lines attached to an aircraft wing and a pilot seat harness by a plurality of support risers and straps comprising:

a) a riser harness loop intermediate quicklink and wing stabilizer retainer having attached to a lower riser harness complex which a riser harness loop intermediate quicklink and wing stabilizer retainer having adhesion material and a means to attach the riser harness loop intermediate quicklink and wing stabilizer retainer adjacent to a main carabiner quicklink having a compatible adhesion material; and b) a wing stabilizer retainer having a compatible adhesion material and attached adjacent to the main carabiner quicklink.

35. An apparatus for control of a lightweight pilot carrying aircraft by adjustments to a plurality of wing suspension lines attached to an aircraft wing and a pilot seat harness by a plurality of support risers and straps comprising:

a) a B riser ring attached to a B riser quicklink with an adhesion material; and b) a wing stabilizer retainer having a compatible adhesion material and attached adjacent to a main carabiner quicklink.

36. The apparatus as in claim 35 wherein the adhesion material is hook and loop.

37. An apparatus for control of a lightweight pilot carrying aircraft by adjustments to a plurality of wing suspension lines attached to an aircraft wing and a pilot seat harness by a plurality of support risers and straps comprising:

a) a trim tab strap attached to D riser and a trim tab buckle strap attached to the D riser below the trim tab strap wherein the trim tab strap having a trim tab jaw buckle through which passes the trim tab buckle strap having a D riser strap attached;

b) the D riser strap passes through a stirrup augmentation system stop ring with the D riser strap having a stirrup augmentation system hook on an end; and c) a stirrup augmentation system ring attached to a speed stirrup cord which speed stirrup cord passes through a speed stirrup cord guide loop attached to a seat board and the stirrup cord attached to a speed stirrup.

38. The apparatus as in claim 37 wherein the stirrup augmentation system hook is attached to the D riser strap by placing a strap eyelet therein through which the stirrup augmentation system hook protrudes and closing the D riser strap around the stirrup augmentation system hook with a means to close.

39. The apparatus as in claim 37 wherein:

a) the trim tab jaw buckle has a means to release attached and the means to release is attached to a sheathed cable;

b) the sheathed cable having a conduit stop at an end of a sheath adjacent to the trim tab jaw buckle;

c) a hub handle bar attached to a riser complex; and d) the hub handle bar comprising a squeeze lever attached to a handle tube wherein the sheathed cable is attached to the squeeze lever.

40. An apparatus for control of a lightweight pilot carrying aircraft by adjustments to a plurality of wing suspension lines attached to an aircraft wing and a pilot seat harness by a plurality of support risers and straps comprising:

a) an A riser supplemental quicklink;

b) a means to connect the A riser supplemental quicklink to the wing suspension lines;

c) the A riser supplemental quicklink attached to a cable which cable passes into a sheath adjacent to a riser complex;

d) the sheathed cable having a conduit stop at an end of the sheath adjacent to the riser complex;

e) a hub handle bar attached to the riser complex; and f) the hub handle bar comprising a rachet wind up gear attached to a handle tube wherein the sheathed cable is attached to the rachet wind up gear.

41. An apparatus for control of a lightweight pilot carrying aircraft by adjustments to a plurality of wing suspension lines attached to an aircraft wing and a pilot seat harness by a plurality of support risers and straps comprising:

a) an A riser supplemental quicklink;

b) a means to connect the A riser supplemental quicklink to the wing suspension lines;

c) a plurality of hub handle bars having a handle tube for each side of the lightweight pilot carrying aircraft which handle tubes are attached to each other by means for attachment and a means for attachment to a riser complex.

42. The apparatus as in claim 41 wherein the means for attachment is a snap for attachment to the riser complex.

43. An apparatus for control of a lightweight pilot carrying aircraft by adjustments to a plurality of wing suspension lines attached to an aircraft wing and a pilot seat harness by a plurality of support risers and straps comprising:

a) an A riser supplemental quicklink;

b) a means to connect the A riser supplemental quicklink to the wing suspension lines;

c) the A riser supplemental quicklink is attached to a sheathed cable;

d) the sheathed cable having a conduit stop at a distance from the A riser supplemental quicklink to allow full wing tip collapse; and e) the sheathed cable attached to a transmission box having a means to connect the sheathed cable to a speed stirrup.

44. An apparatus for control of a lightweight pilot carrying aircraft by adjustments to a plurality of wing suspension lines attached to an aircraft wing and a pilot seat harness by a plurality of support risers and straps comprising:

a) a B riser ring connected to a B riser suspension line and attached to a sheathed cable;

b) the sheathed cable having a conduit stop at a distance from the B riser ring to allow full B riser stall wing collapse; and c) the sheathed cable attached to a transmission box having a means to connect the sheathed cable to a speed stirrup.

45. An apparatus for control of a lightweight pilot carrying aircraft by adjustments to a plurality of wing suspension lines attached to an aircraft wing and a pilot seat harness by a plurality of support risers and straps comprising:

a) a trim tab strap attached to a D riser and a trim tab buckle strap attached to the D riser below the trim tab strap wherein the trim tab strap having a trim tab jaw buckle through which passes the trim tab buckle strap;

b) a sheathed cable attached to the trim tab buckle strap;

c) the sheathed cable having a conduit stop at a distance from the trim tab buckle to allow full travel of the trim tab buckle strap; and d) the sheathed cable attached to a transmission box having a means to connect the sheathed cable to a speed stirrup.

46. An apparatus for control of a lightweight pilot carrying aircraft by adjustments to a plurality of wing suspension lines attached to an aircraft wing and a pilot seat harness by a plurality of support risers and straps comprising:

a speed stirrup cord equivalent attached to a lower riser complex and the speed stirrup cord passing through a speed system pulley which is attached to the lower riser complex with the speed stirrup cord attached to a sheathed cable; the sheathed cable having a conduit stop at a distance from the speed system pulley to allow full travel of the speed stirrup cord; and the sheathed cable having a conduit stop at an end of a sheath adjacent to the main carabiner quicklink; and the sheathed cable attached to a means to connect the sheathed cable to a speed stirrup.

47. The apparatus as in claim 46 wherein the means to connect to a speed stirrup is a transmission box.

48. An apparatus for control of a lightweight pilot carrying aircraft by adjustments to a plurality of wing suspension lines attached to an aircraft wing and a pilot seat harness by a plurality of support risers and straps comprising:

a) a brake loop quicklink attached to a brake line adjacent to the brake loop;

b) the brake loop quicklink is attached to a cable which cable enters a sheath adjacent to a harness strap;

c) the sheathed cable having a conduit stop at an end of the sheath adjacent to the harness strap; and d) the sheathed cable attached to a transmission box having a means to connect the sheathed cable to a speed stirrup.

49. An apparatus for control of a lightweight pilot carrying aircraft by adjustments to a plurality of wing suspension lines attached to an aircraft wing and a pilot seat harness by a plurality of support risers and straps comprising:

a) an A riser supplement quicklink;

b) the front two A riser suspension lines attached to the A riser supplemental quicklink and attached to the wing suspension lines; and c) the supplemental quicklink suspending a supplemental riser strap attached to a riser complex.

* * * * *